United States Patent
Wu et al.

(10) Patent No.: US 12,434,351 B2
(45) Date of Patent: Oct. 7, 2025

(54) POLYMER BOND ABRASIVE ARTICLES INCLUDING CONTINUOUS POLYMER MATRIX, AND METHODS OF MAKING SAME

(71) Applicant: 3M INNOVATIVE PROPERTIES COMPANY, St. Paul, MN (US)

(72) Inventors: Tianyu Wu, St. Paul, MN (US); Gareth A. Hughes, St. Paul, MN (US); Bruce A. Sventek, Woodbury, MN (US); Fabian Stolzenburg, Woodbury, MN (US); Jing Chen, Newark, CA (US); Gregory A. Kobussen, Woodbury, MN (US); Robert L.W. Smithson, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 588 days.

(21) Appl. No.: 17/775,639

(22) PCT Filed: Dec. 4, 2020

(86) PCT No.: PCT/IB2020/061524
§ 371 (c)(1),
(2) Date: May 10, 2022

(87) PCT Pub. No.: WO2021/116859
PCT Pub. Date: Jun. 17, 2021

(65) Prior Publication Data
US 2022/0395961 A1    Dec. 15, 2022

Related U.S. Application Data

(60) Provisional application No. 62/947,169, filed on Dec. 12, 2019.

(51) Int. Cl.
B24D 3/34 (2006.01)
B24D 18/00 (2006.01)
(Continued)

(52) U.S. Cl.
CPC ......... B24D 3/344 (2013.01); B24D 18/0072 (2013.01); B29C 64/124 (2017.08);
(Continued)

(58) Field of Classification Search
CPC .......... B24D 3/344; B24D 3/342; B24D 3/34; B24D 3/00; B24D 18/0072; B24D 18/00;
(Continued)

(56) References Cited

U.S. PATENT DOCUMENTS 4,314,827 A    2/1982   Leitheiser et al.
4,588,420 A    5/1986   Charvat
(Continued)

FOREIGN PATENT DOCUMENTS

CN    1671510 A      9/2005
CN    102131887 A    7/2011
(Continued)

OTHER PUBLICATIONS

National Center for Biotechnology Information. "PubChem Compound Summary for CID 81984, 2-Hydroxy-2-methylpropiophenone" PubChem, https://pubchem.ncbi.nlm.nih.gov/compound/2-Hydroxy-2-methylpropiophenone. Accessed Feb. 19, 2025.*
(Continued)

*Primary Examiner* — Amber R Orlando
*Assistant Examiner* — Sarah Catherine Case
(74) *Attorney, Agent, or Firm* — Adrian L. Pishko

(57) ABSTRACT

A polymer bond abrasive article is formed of a continuous photocured polymer matrix having abrasive particles retained therein. The photocured polymer matrix includes at least one of an optical brightener or a light absorber, and the
(Continued)

polymer bond abrasive article has a three-dimensional shape. An abrasive tool includes the abrasive article affixed to a shaft or a pad. Further, a method of making the polymer bond abrasive article includes a) obtaining a photocurable composition liquid dispersion; b) selectively curing a portion of the photocurable composition; and repeating steps a) and b) to form the polymer bond abrasive article. The dispersion contains at least one photocurable component; abrasive particles; a photoinitiator; and at least one of an optical brightener or a light absorber.

16 Claims, 13 Drawing Sheets

(51) Int. Cl.

| | | |
|---|---|---|
| *B29C 64/124* | (2017.01) | |
| *B33Y 10/00* | (2015.01) | |
| *B33Y 70/10* | (2020.01) | |
| *B29K 105/00* | (2006.01) | |
| *B29K 105/16* | (2006.01) | |
| *B29K 509/04* | (2006.01) | |

(52) U.S. Cl.
CPC .............. *B33Y 10/00* (2014.12); *B33Y 70/10* (2020.01); *B24D 2203/00* (2013.01); *B29K 2105/0044* (2013.01); *B29K 2105/16* (2013.01); *B29K 2509/04* (2013.01); *B29K 2995/007* (2013.01); *B29K 2995/0097* (2013.01)

(58) Field of Classification Search
CPC ... B24D 2203/00; B29C 64/124; B33Y 10/00; B33Y 70/10; B29K 2105/0044; B29K 2105/16; B29K 2509/04; B29K 2995/007; B29K 2995/0097
See application file for complete search history.

(56) References Cited

U.S. PATENT DOCUMENTS

| | | | |
|---|---|---|---|
| 4,623,364 A | 11/1986 | Cottringer et al. | |
| 4,642,126 A | 2/1987 | Zador et al. | |
| 4,652,274 A | 3/1987 | Boettcher et al. | |
| 4,744,802 A | 5/1988 | Schwabel et al. | |
| 4,770,671 A | 9/1988 | Monroe et al. | |
| 4,881,951 A | 11/1989 | Wood et al. | |
| 5,667,541 A * | 9/1997 | Klun | B24D 3/344 51/298 |
| 6,236,020 B1 | 5/2001 | Friedman | |
| 6,312,254 B1 | 11/2001 | Friedman | |
| 6,320,162 B1 | 11/2001 | Friedman | |
| 6,458,018 B1 | 10/2002 | Goers et al. | |
| 6,551,366 B1 | 4/2003 | D'Souza et al. | |
| 6,790,126 B2 * | 9/2004 | Wood | C04B 35/62886 451/526 |
| 7,015,423 B2 | 3/2006 | Friedman | |
| 7,867,302 B2 | 1/2011 | Nevoret et al. | |
| 7,927,538 B2 | 4/2011 | Moszner et al. | |
| 8,226,737 B2 | 7/2012 | Lugg et al. | |
| 9,205,601 B2 | 12/2015 | Desimone et al. | |
| 9,360,757 B2 | 6/2016 | Desimone et al. | |
| 9,783,718 B2 | 10/2017 | Stevenson et al. | |
| 10,172,690 B1 | 1/2019 | Friedman et al. | |
| 10,293,458 B2 | 5/2019 | Lugg et al. | |
| 2007/0031791 A1 | 2/2007 | Cinader, Jr. et al. | |
| 2016/0107290 A1 | 4/2016 | Bajaj et al. | |
| 2017/0119498 A1 | 5/2017 | Discko et al. | |
| 2017/0225298 A1 * | 8/2017 | Goers | B24D 3/14 |
| 2018/0104793 A1 | 4/2018 | Franke et al. | |
| 2018/0126515 A1 | 5/2018 | Franke et al. | |
| 2018/0250647 A1 | 9/2018 | Sundstrom et al. | |
| 2018/0264626 A1 | 9/2018 | Sventek et al. | |
| 2019/0047604 A1 | 2/2019 | Banno et al. | |
| 2019/0142700 A1 | 5/2019 | Baeten et al. | |
| 2020/0197138 A1 | 6/2020 | Parkar et al. | |
| 2020/0332162 A1 * | 10/2020 | Sorenson | C08J 9/0066 |
| 2021/0267849 A1 | 9/2021 | Hahn et al. | |
| 2021/0292243 A1 | 9/2021 | Hughes et al. | |

FOREIGN PATENT DOCUMENTS

| | | | |
|---|---|---|---|
| CN | 110140086 A | 8/2017 | |
| DE | 102018114690 A1 | 12/2019 | |
| EP | 1151728 A1 | 11/2011 | |
| EP | 2726049 A2 | 5/2014 | |
| EP | 3207560 A1 | 8/2017 | |
| JP | 2001314423 A | 11/2001 | |
| RU | 2045547 C1 | 10/1995 | |
| WO | 2004/011196 A1 | 2/2004 | |
| WO | 2006104499 A2 | 10/2006 | |
| WO | 2012003136 A1 | 1/2012 | |
| WO | 2014197244 A1 | 12/2014 | |
| WO | 2015048768 A1 | 4/2015 | |
| WO | WO-2016061544 A1 * | 4/2016 | .......... B24B 37/205 |
| WO | 2018/119026 A1 | 6/2018 | |
| WO | 2018118566 A1 | 6/2018 | |
| WO | 2018156787 A1 | 8/2018 | |
| WO | 2019048963 A1 | 3/2019 | |
| WO | 2020157598 A1 | 8/2020 | |

OTHER PUBLICATIONS

Ningbo Inno Pharmchem Co., "2-Hydroxy-2-methylpropiophenone: A Versatile Photoinitiator", https://www.nbinno.com/?news/YVA-2-hydroxy-2-methylpropiophenone-a-versatile-photoinitiator. Accessed Feb. 19, 2025.*

Steelceram Ceramic Solutions, "Alumina and Its Mechanical Properties", https://www.steelceram.com/en/alumina-and-its-mechanical-properties/#:~:text=Hardness%3A%20Alumina%20is%20a%209,can%20exceed%20that%20of%20Zirconia. Accessed Feb. 19, 2025.*

International Search Report for PCT Application No. PCT/IB2020/061524, mailed on Mar. 16, 2021, 7 pages.

* cited by examiner

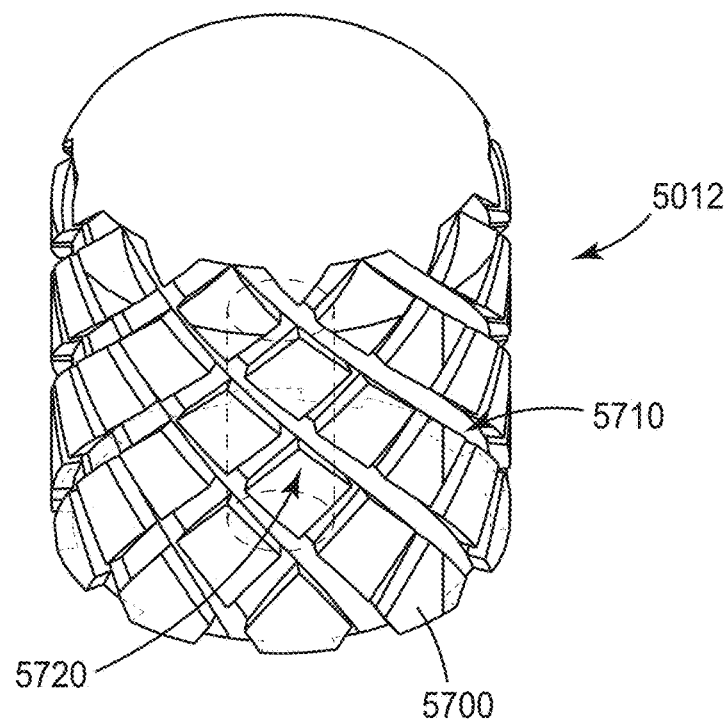
FIG. 5I
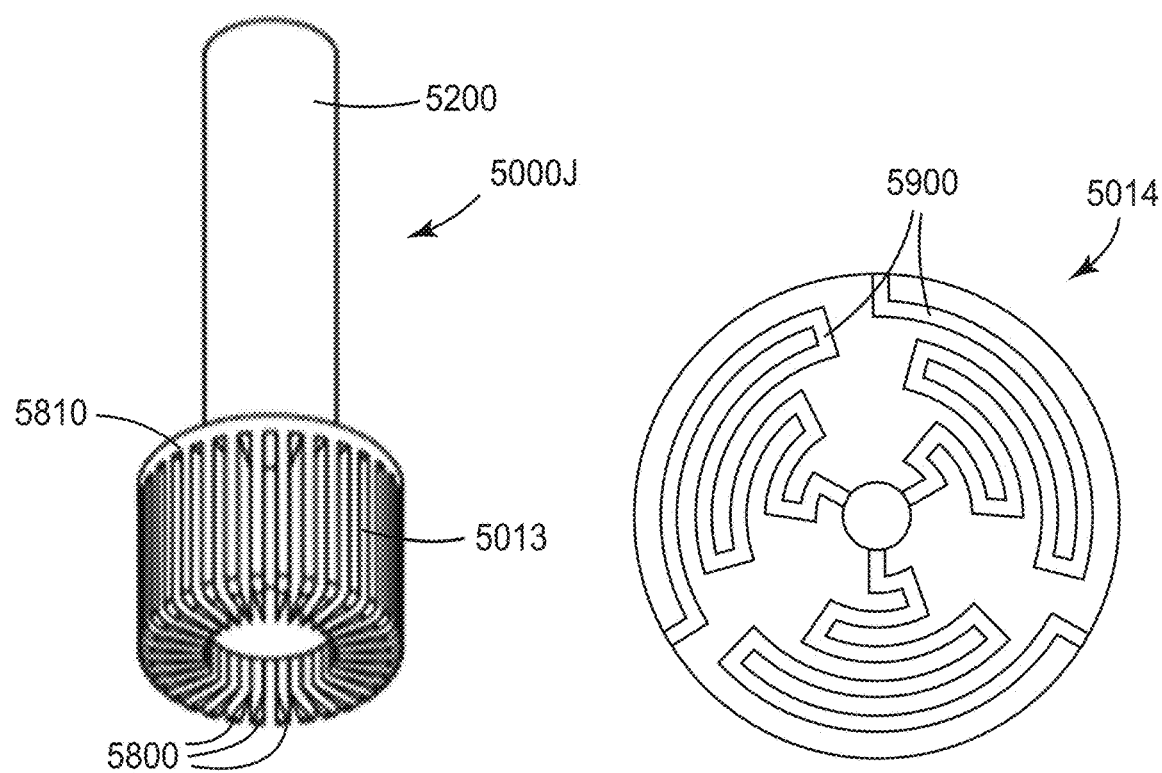
FIG. 5J
FIG. 5K

POLYMER BOND ABRASIVE ARTICLES INCLUDING CONTINUOUS POLYMER MATRIX, AND METHODS OF MAKING SAME

SUMMARY

In a first aspect, the present disclosure provides a polymer bond abrasive article formed of a continuous photocured polymer matrix comprising abrasive particles retained therein. The photocured polymer matrix comprises at least one of an optical brightener or a light absorber, and the polymer bond abrasive article has a three-dimensional shape.

In a second aspect, the present disclosure provides an abrasive tool comprising the polymer bond abrasive article according to the first aspect, wherein the article is affixed to a shaft or to a pad.

In a third aspect, the present disclosure provides a method of making the polymer bond abrasive article according to the first aspect. The method comprises a) obtaining a photocurable composition liquid dispersion; b) selectively curing a portion of the photocurable composition; and repeating steps a) and b) to form the polymer bond abrasive article. The dispersion comprises at least one photocurable component; abrasive particles; a photoinitiator; and at least one of an optical brightener or a light absorber.

Polymer bond abrasive articles and tools according to the present disclosure can be useful for glass, ceramic, or polymer substrate polishing.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF DRAWINGS

FIG. 5I is a schematic perspective view of an exemplary polymer bond abrasive article comprising a cup shape, preparable according to the present disclosure.

FIG. 5J is a schematic perspective view of an exemplary polymer bond abrasive article comprising a plurality of separated substructures, preparable according to the present disclosure.

FIG. 5K is a schematic top view of an exemplary polymer bond abrasive article comprising a plurality of tortuous channels, preparable according to the present disclosure.

Figure 1:
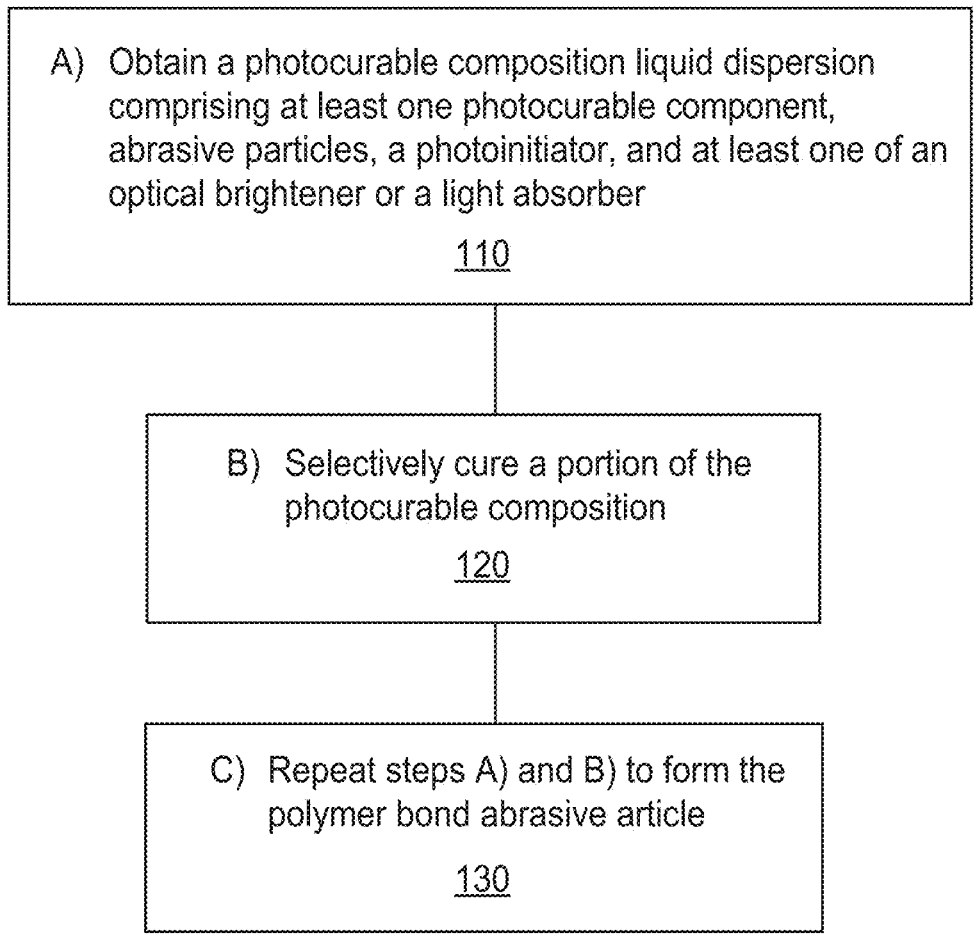
FIG. 1 is a generalized process flow diagram of a method of making a polymer bond abrasive article according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +1-10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

As used herein, "aliphatic group" means a saturated or unsaturated linear, branched, or cyclic hydrocarbon group. This term is used to encompass alkyl, alkenyl, and alkynyl groups, for example.

As used herein, "alkyl" means a linear or branched, cyclic or acyclic, saturated monovalent hydrocarbon having from one to thirty-two carbon atoms, e.g., methyl, ethyl, 1-propyl, 2-propyl, pentyl, and the like.

As used herein, "alkylene" means a linear saturated divalent hydrocarbon having from one to twelve carbon atoms or a branched saturated divalent hydrocarbon radical having from three to twelve carbon atoms, e.g., methylene, ethylene, propylene, 2-methylpropylene, pentylene, hexylene, and the like.

As used herein, each of "alkenyl" and "ene" refers to a monovalent linear or branched unsaturated aliphatic group with one or more carbon-carbon double bonds, e.g., vinyl.

As used herein, the term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

As used herein, "aralkylene" refers to a divalent group that is an alkylene group substituted with an aryl group or an alkylene group attached to an arylene group. The term "alkarylene" refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms.

As used herein, the term "continuous" with respect to a polymer matrix means that the polymer matrix has an uninterrupted structure and covers all particles that are fully contained in an interior of the polymer matrix, as determined using cross-section scanning electron microscopy (SEM). Preferably, each particle has a coating of polymer matrix that is at least 10 nanometers thick. Being continuous encompasses the polymer matrix having porosity.

As used herein, the term "hardenable" refers to a material that can be cured or solidified, e.g., by heating to remove solvent, heating to cause polymerization, chemical cross-linking, radiation-induced polymerization or crosslinking, or the like.

As used herein, "curing" means the hardening or partial hardening of a composition by any mechanism, e.g., by heat, light, radiation, e-beam, microwave, chemical reaction, or combinations thereof.

As used herein, "cured" refers to a material or composition that has been hardened or partially hardened (e.g., polymerized or crosslinked) by curing.

As used herein, "photocured" refers to a material or composition that has been hardened or partially hardened using actinic radiation.

As used herein, "integral" refers to being made at the same time or being incapable of being separated without damaging one or more of the (integral) parts.

As used herein, "liquid" refers to the state of matter that is not solid or gas, which has a definite volume and an indefinite shape. Liquids encompass emulsions, dispersions, suspensions, solutions, and pure components, and exclude (e.g., solid) powders and particulates.

As used herein, the term "(meth)acrylate" is a shorthand reference to acrylate, methacrylate, or combinations thereof, "(meth)acrylic" is a shorthand reference to acrylic, methacrylic, or combinations thereof, and "(meth)acryl" is a shorthand reference to acryl and methacryl groups. "Acryl" refers to derivatives of acrylic acid, such as acrylates, methacrylates, acrylamides, and methacrylamides. By "(meth)acryl" is meant a monomer or oligomer having at least one acryl or methacryl groups, and linked by an aliphatic segment if containing two or more groups. As used herein, "(meth)acrylate-functional compounds" are compounds that include, among other things, a (meth)acrylate moiety.

As used herein, "ceramic" and "ceramic article" include amorphous material, glass, crystalline ceramic, glass-ceramic, and combinations thereof, and refers to non-metallic materials produced by application of heat. Ceramics are usually classified as inorganic materials. The term "amorphous material" refers to material that lacks long range crystal structure as determined by X-ray diffraction and/or has an exothermic peak corresponding to the crystallization of the amorphous material as determined by DTA (differential thermal analysis). The term "glass" refers to amorphous material exhibiting a glass transition temperature. The term "glass-ceramic" refers to ceramics comprising crystals formed by heat-treating amorphous material. The term "crystalline ceramic" refers to a ceramic material exhibiting a discernible X-ray powder diffraction pattern. "Crystalline" means a solid composed of atoms arranged in a pattern periodic in three dimensions (i.e., has long-range crystal structure, which may be determined by techniques such as X-ray diffraction). A "crystallite" means a crystalline domain of a solid having a defined crystal structure. A crystallite can only have one crystal phase. "Semicrystalline" means a material that comprises both an amorphous region and a crystalline region.

As used herein, "ceramic particle" encompasses particles of amorphous material, glass, crystalline ceramic, glass-ceramic, and combinations thereof, and refers to non-metallic materials produced by application of heat or made by a chemical synthesis process. Ceramic particles are usually classified as inorganic materials. The term "amorphous material" with respect to ceramic particles refers to a material derived from a melt and/or a vapor phase as well as a material made from chemical synthesis, wherein the material lacks long range crystal structure as determined by X-ray diffraction and/or has an exothermic peak corresponding to the crystallization of the amorphous material as determined by DTA (differential thermal analysis). For instance, amorphous silica nanoparticles may be generated by condensation of silanes to form the nanoparticles.

As used herein, "architectural void" refers to a void almost fully encompassed within an article (e.g., does not extend to any exterior surface of the article more than needed to allow removal of uncured composition) and that has a designed shape, such as one programmed into an additive manufacturing device employed to selectively cure the photopolymerizable composition to create a shape of the article. An architectural void is in contrast to an internal pore formed during manufacture of the article The term "mass inertial force" as referred to herein may be specified as force per unit mass and therefore may be specified in the unit $m/s^2$. Further, the mass inertial force can be expressed by the G-force which is a factor of the acceleration of gravity. For the purposes of the present specification the acceleration of gravity is 9.81 $m/s^2$. Consequently, for example a mass inertial force of 9.81 $m/s^2$ can be expressed as 1 G.

As used herein, "particle" refers to a substance being a solid having a shape which can be geometrically determined. The shape can be regular or irregular. Particles can typically be analyzed with respect to e.g., particle size and particle size distribution. A particle can comprise one or more crystallites. Thus, a particle can comprise one or more crystal phases.

As used herein, "polymerizable composition" means a hardenable composition that can undergo polymerization upon initiation (e.g., free-radical polymerization initiation, ring opening polymerization, etc.). Typically, prior to polymerization (e.g., hardening), the polymerizable composition has a viscosity profile consistent with the requirements and parameters of one or more 3D printing systems. In some embodiments, for instance, hardening comprises irradiating with actinic radiation having sufficient energy to initiate a polymerization or cross-linking reaction. For instance, in some embodiments, ultraviolet (UV) radiation, e-beam radiation, or both, can be used. When actinic radiation can be used, the polymerizable composition is referred to as a "photocurable composition". As used herein, "photocurable composition liquid dispersion" refers to a photocurable composition that has a continuous liquid phase and discontinuous solids (e.g., abrasive particles) dispersed in the continuous liquid phase. Polymerizable components of the photocurable composition are in a continuous liquid phase.

As used herein, a "resin" contains all polymerizable components (monomers, oligomers and/or polymers) being present in a hardenable composition. The resin may contain only one polymerizable component compound or a mixture of different polymerizable compounds.

As used herein, "solvent" refers to a nonreactive liquid component of a composition that dissolves at least one solid component, or dilutes at least one liquid component, of the composition (in the case of water, adventitious amounts of water are not included by the term "solvent").

As used herein, "solid" refers to a state of matter that is solid at one atmosphere of pressure and at least one temperature in the range of from 20-25° C., inclusive, (as opposed to being in a gaseous or liquid state of matter).

As used herein, "thermoplastic" refers to a polymer that flows when heated sufficiently above its glass transition point and become solid when cooled.

As used herein, "thermoset" refers to a polymer that permanently sets upon curing and does not flow upon subsequent heating. Thermoset polymers are typically cross-linked polymers.

The present disclosure provides polymer bond abrasive articles and methods of making the articles. Advantageously, the polymer bond abrasive articles can have complex geometries that are not achievable by wrapping an abrasive sheet around a shaft. The design flexibility of using additive manufacturing to make the polymer bond abrasive articles allows formation of articles intended to grind and/or polish specific structures, such as glass.

In a first aspect, a polymer bond abrasive article is provided. The polymer bond abrasive article is formed of a continuous photocured polymer matrix comprising abrasive particles retained therein, wherein the photocured polymer matrix comprises at least one of an optical brightener or a light absorber, and wherein the polymer bond abrasive article has a three-dimensional shape. Accordingly, the polymer bond abrasive article is not an abrasive sheet on a backing (e.g., having a generally two-dimensional shape in the x- and y-axes with a small thickness in the z-axis).

In a second aspect, an abrasive tool is provided. The abrasive tool comprises the polymer bond abrasive article according to the first aspect, wherein the article is affixed to a shaft or to a pad.

In a third aspect, a method of making a polymer bond abrasive article is provided. The method comprises:
a) obtaining a photocurable composition liquid dispersion comprising:
  i) at least one photocurable component;
  ii) abrasive particles;
  iii) a photoinitiator; and
  iv) at least one of an optical brightener or a light absorber;
b) selectively curing a portion of the photocurable composition; and
c) repeating steps a) and b) to form the polymer bond abrasive article comprising a continuous photocured polymer matrix comprising abrasive particles retained therein and at least one of the optical brightener or the light absorber.

The below disclosure relates to each of the first through third aspects.

Typically, the photocurable composition is cured using actinic radiation comprising UV radiation, e-beam radiation, visible radiation, or a combination thereof.

Referring to FIG. 1, a generalized flow chart is provided of a process of making a polymer bond abrasive article. In particular, the process includes the Steps of A) obtaining a photocurable composition liquid dispersion comprising at least one photocurable component, abrasive particles, a photoinitiator, and at least one of an optical brightener or a light absorber 110; B) selectively curing a portion of the photocurable composition 120; and C) repeating steps A) and B) to form the polymer bond abrasive article 130.

Methods of printing a three-dimensional article or object described herein can include forming the article from a plurality of layers of a photocurable composition described herein in a layer-by-layer manner. Further, the layers of a build material composition can be deposited according to an image of the three-dimensional article in a computer readable format. In some or all embodiments, the photocurable composition is deposited according to preselected computer aided design (CAD) parameters (e.g., a data file).

Additionally, it is to be understood that methods of manufacturing a 3D article described herein can include so-called "stereolithography/vat polymerization" 3D printing methods. It is entirely possible to form a 3D article from a photocurable composition described herein using vat polymerization (e.g., stereolithography). For example, in some cases, a method of printing a 3D article comprises retaining a photocurable composition described herein in a fluid state in a container and selectively applying energy to the photocurable composition in the container to solidify at least a portion of a fluid layer of the photocurable composition, thereby forming a hardened layer that defines a cross-section of the 3D article. Additionally, a method described herein can further comprise raising or lowering the hardened layer of photocurable composition to provide a new or second fluid layer of unhardened photocurable composition at the surface of the fluid in the container, followed by again selectively applying energy to the photocurable composition in the container to solidify at least a portion of the new or second fluid layer of the photocurable composition to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying the photocurable composition. Moreover, selectively applying energy to the photocurable composition in the container can comprise applying actinic radiation, such as UV radiation, visible radiation, or e-beam radiation, having a sufficient energy to cure the photocurable composition. A method described herein can also comprise planarizing a new layer of fluid photocurable composition provided by raising or lowering an elevator platform. Such planarization can be carried out, in some cases, by utilizing a wiper or roller or a recoater. Planarization corrects the thickness of one or more layers prior to curing the material by evening the dispensed material to remove excess material and create a uniformly smooth exposed or flat up-facing surface on the support platform of the printer.

Figure 2:
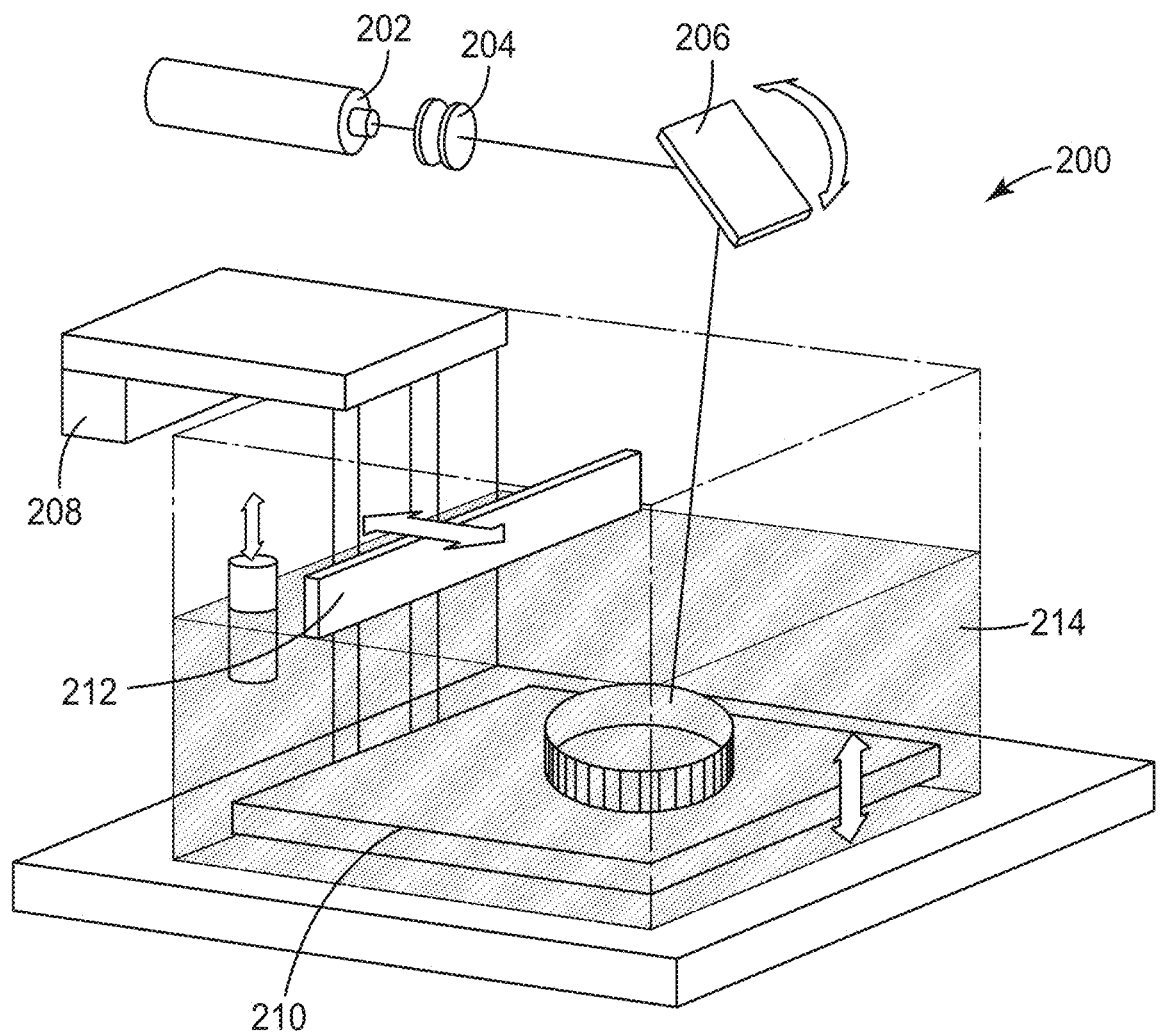
FIG. 2 is a generalized schematic of a stereolithography apparatus.

It is further to be understood that the foregoing process can be repeated a selected number of times to provide the 3D article. For example, in some cases, this process can be repeated "n" number of times. Further, it is to be understood that one or more steps of a method described herein, such as a step of selectively applying energy to a layer of photocurable composition, can be carried out according to an image of the 3D article in a computer-readable format. Suitable stereolithography printers include the Viper Pro SLA, available from 3D Systems, Rock Hill, SC and the Asiga PICO PLUS 39, available from Asiga USA, Anaheim Hills, CA FIG. 2 shows an exemplary stereolithography apparatus ("SLA") that may be used with the photocurable compositions and methods described herein. In general, the SLA 200 may include a laser 202, optics 204, a steering lens 206, an elevator 208, a platform 210, and a straight edge 212, within a vat 214 filled with the photocurable composition. In operation, the laser 202 is steered across a surface of the photocurable composition to cure a cross-section of the photocurable composition, after which the elevator 208 slightly lowers the platform 210 and another cross section is cured. The straight edge 212 may sweep the surface of the cured composition between layers to smooth and normalize the surface prior to addition of a new layer. In other embodiments, the vat 214 may be slowly filled with liquid resin while an article is drawn, layer by layer, onto the top surface of the photocurable composition.

A related technology, vat polymerization with Digital Light Processing ("DLP"), also employs a container of curable polymer (e.g., photopolymerizable or photocurable composition). However, in a DLP based system, a two-dimensional cross section is projected onto the curable material to cure the desired section of an entire plane transverse to the projected beam at one time. All such curable polymer systems as may be adapted to use with the photocurable compositions described herein are intended to fall within the scope of the term "vat polymerization system" as used herein.

Other techniques for three-dimensional manufacturing are known, and may be suitably adapted to use in the applications described herein. More generally, three-dimensional fabrication techniques continue to become available. All such techniques may be adapted to use with photocurable compositions described herein, provided they offer compatible fabrication viscosities and resolutions for the specified article properties, for instance continuous additive manufacturing in which a build plate is (essentially) continuously moved through a vat of photocurable material. In certain embodiments, an apparatus adapted to be used in a continuous mode may be employed, such as an apparatus commercially available from Carbon 3D, Inc. (Redwood City, CA), for instance as described in U.S. Pat. Nos. 9,205,601 and 9,360,757 (both to DeSimone et al.). Fabrication may be performed using any of the fabrication technologies described herein, either alone or in various combinations, using data representing a three-dimensional object, which may be reformatted or otherwise adapted as necessary for a particular printing or other fabrication technology.

In certain embodiments, the method further comprises d) moving the polymer bond abrasive article and thereby generating a mass inertial force in uncured photocurable composition on the polymer bond abrasive article, wherein the mass inertial force is generated using a centrifuge, a shaker, or a mixer that spins along one or more axes. Suitable ways of generating a mass inertial force are described, for instance, in co-owned International Application Publication No. WO 2020/157598 (Chakraborty et al.), incorporated herein by reference in its entirety. For instance, the source of the mass inertial force may be generated using a centrifuge, a shaker, or a mixer that spins along one or more axes. In some embodiments, the moving of the object is a rotation or spinning of the object. Accordingly, the mass inertial force may be generated by a centrifugal force. One suitable mixer that spins along more than one axis is a dual asymmetric centrifugal mixer, such as the DAC 400 FVZ available from Flacktek, Landrum, SC A dual asymmetric centrifugal mixer provides simultaneous dual axis spinning that automatically reorients the article during spinning, which tends to pull uncured composition out of concave features of the article in a short period of time (e.g., 20, 15, or 10 seconds or less).

Optionally, the method further comprises e) removing excess uncured photocurable composition on the polymer bond abrasive article by washing with at least one solvent. Suitable solvents include, for instance and without limitation, propylene carbonate, isopropanol, methanol, di(ethylene glycol)ethyl ether, tripropylene glycol monomethyl ether, diethylene glycol monobutyl ether, a blend of dipropylene glycol monomethyl ether with [2-(2-methoxymethylethoxy)methylethoxy]propanol, and combinations thereof.

In some embodiments, the method further comprises f) subjecting the polymer bond abrasive article to actinic radiation to photopolymerize uncured photocurable composition.

Figure 3:
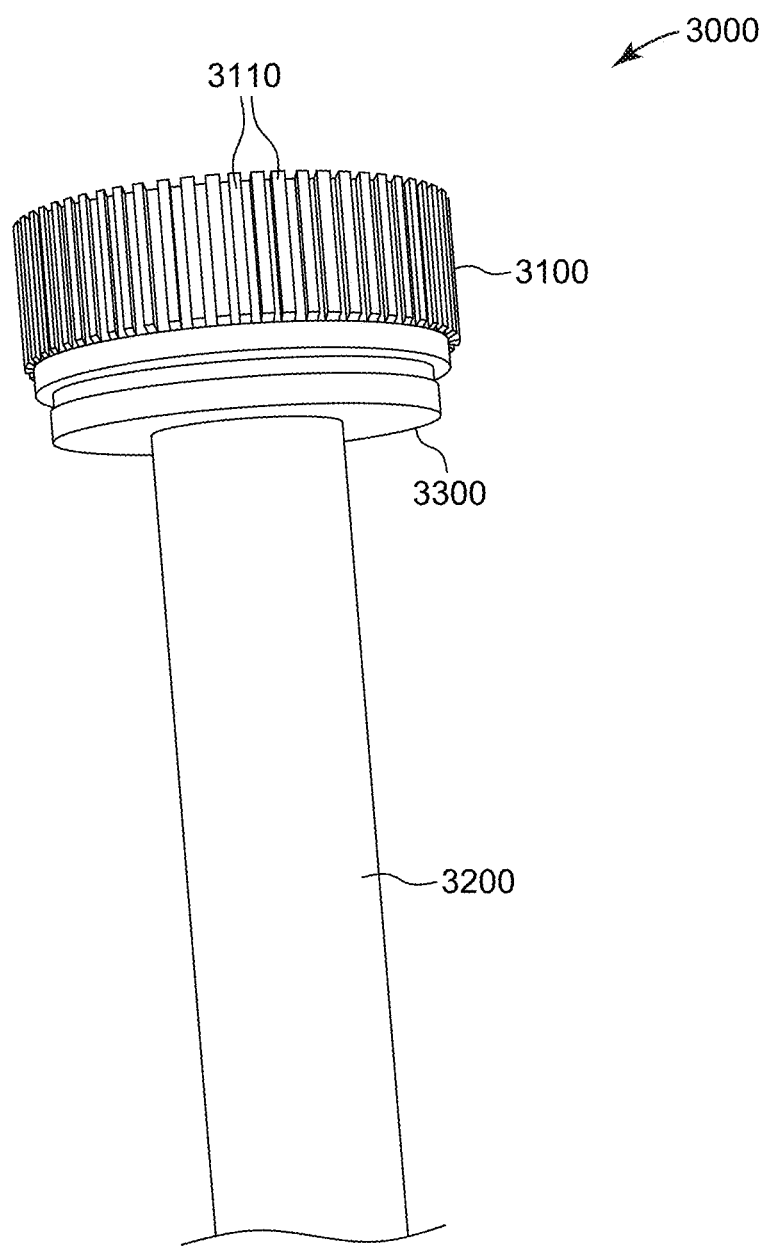
FIG. 3 is a photograph of an exemplary abrasive tool according to the present disclosure.

Referring now to FIG. 3, a photograph of an exemplary abrasive tool 3000 is shown comprising a polymer bond abrasive article 3100 attached to a foam layer 3300 and affixed to a shaft 3200. The polymer bond abrasive article 3100 comprises a nonplanar abrasive structure, e.g., plurality of ridges 3110 formed by a continuous polymer matrix comprising abrasive particles distributed therein. Advantageously, less labor is required to fabricate a three-dimensional abrasive tool than one in which an adhesive sheet is wrapped around a shaft. The polymer bond abrasive article 3100 is free of any seam or splice due to being formed to have a three-dimensional shape instead of being wrapped around the shaft 3200.

Figure 4A:
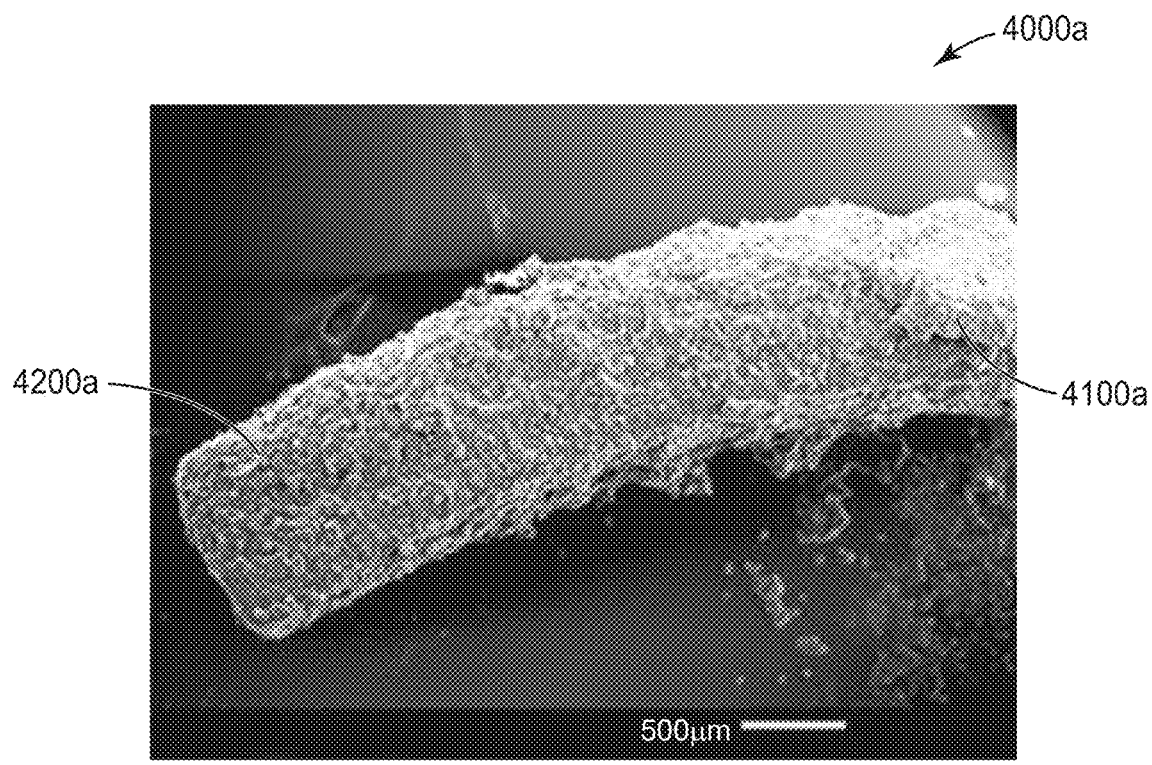
FIG. 4A is a scanning electron microscopy (SEM) image at a magnification of 30× of a portion of an exemplary polymer bond abrasive article according to the present disclosure.
Figure 4B:
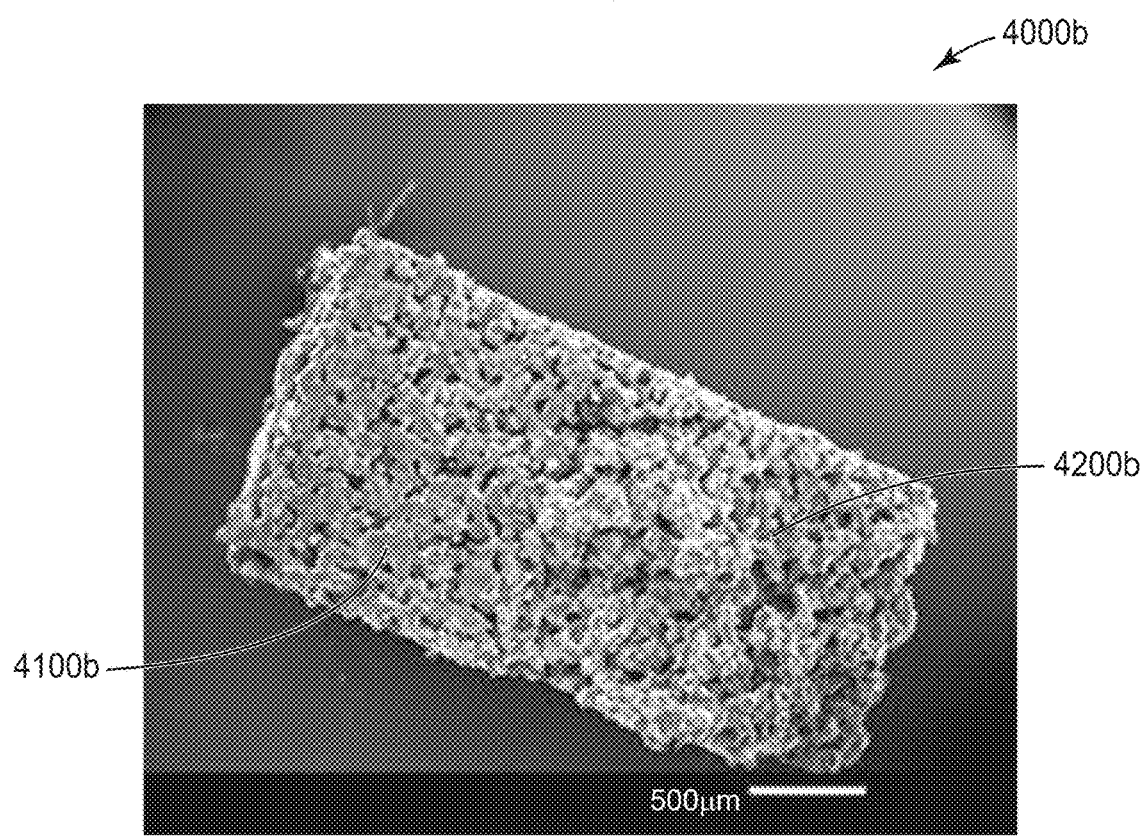
FIG. 4B is an SEM image at a magnification of 30× of a portion of a comparative polymer bond abrasive article.
Figure 4C:
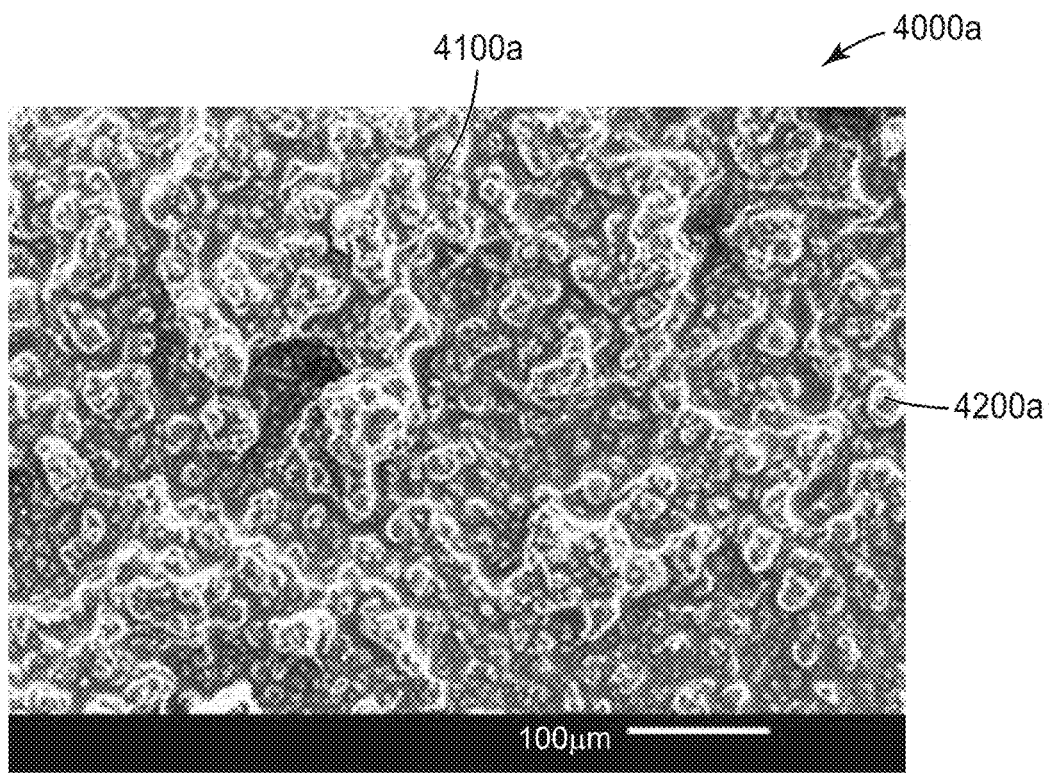
FIG. 4C is an SEM image at a magnification of 200× of a portion of the exemplary polymer bond abrasive article of FIG. 4A.
Figure 4D:
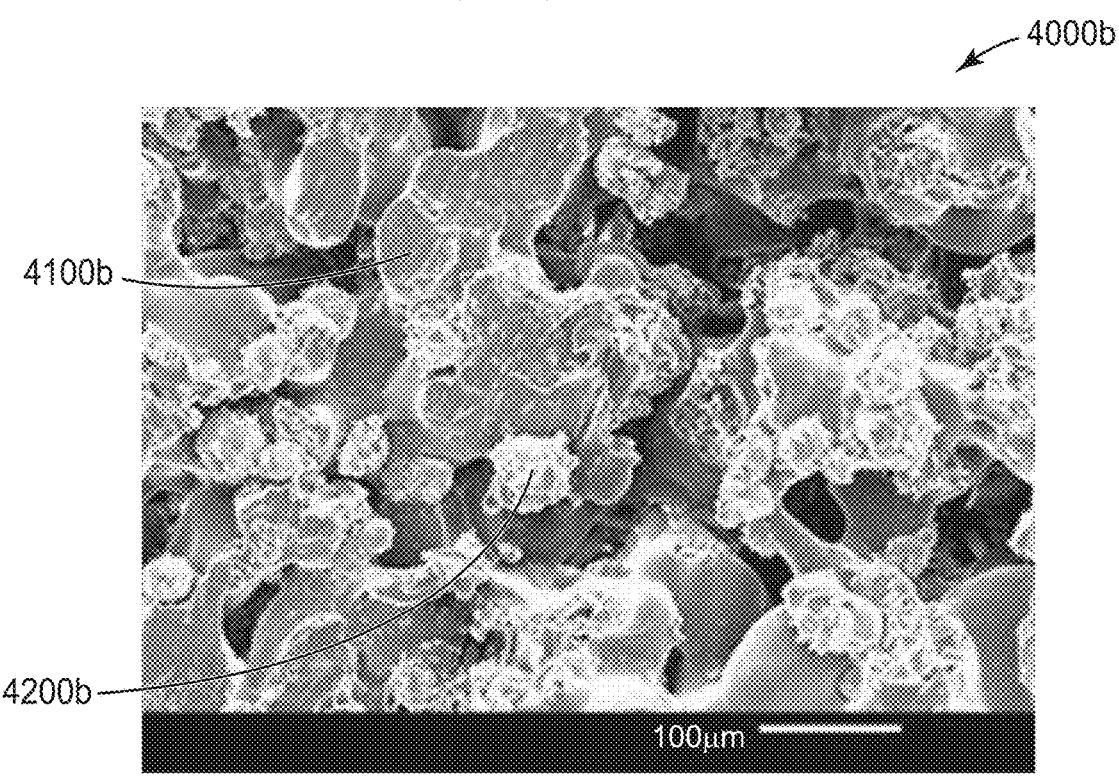
FIG. 4D is an SEM image at a magnification of 200× of a portion of the comparative polymer bond abrasive article of FIG. 4B.
Figure 4E:
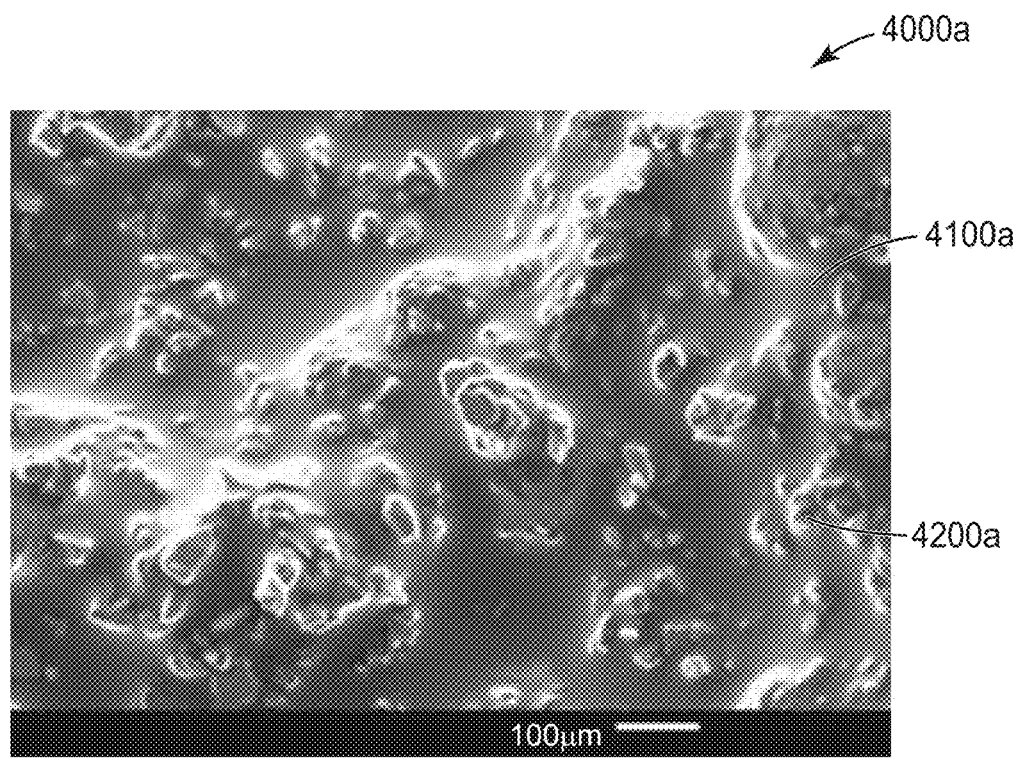
FIG. 4E is an SEM image at a magnification of 1,200× of a portion of the exemplary polymer bond abrasive article of FIG. 4A.
Figure 4F:
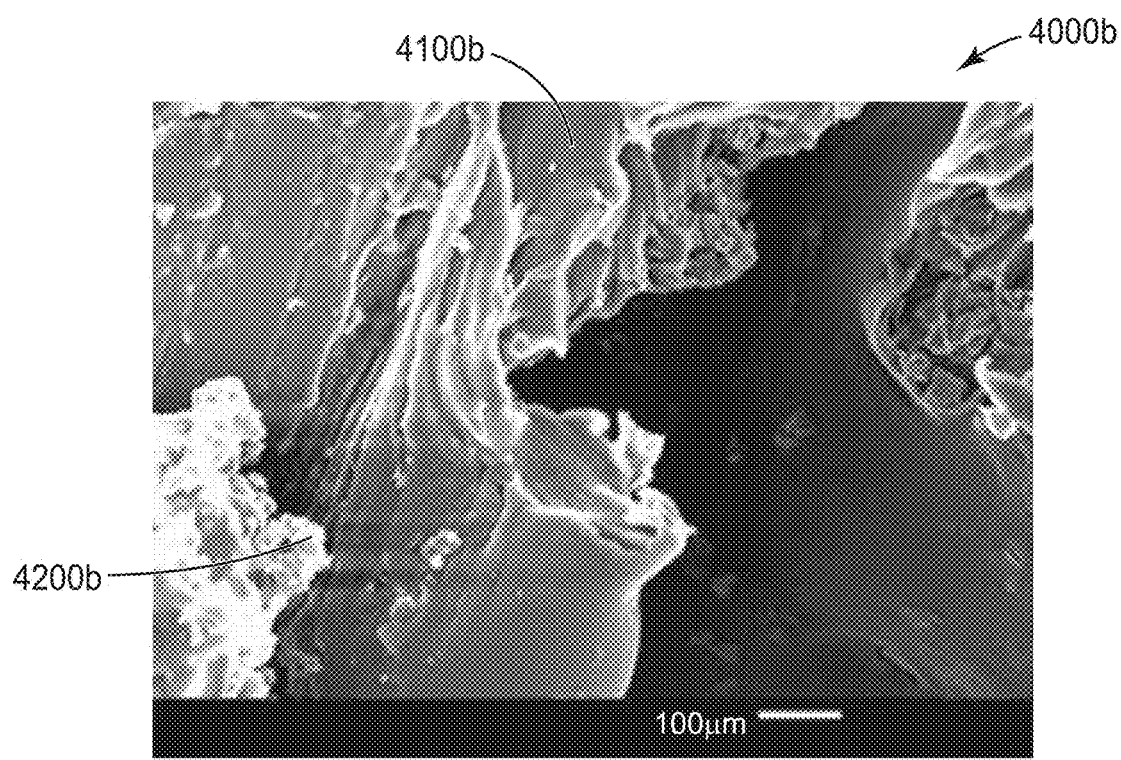
FIG. 4F is an SEM image at a magnification of 1,200× of a portion of the comparative polymer bond abrasive article of FIG. 4B.

Referring to FIGS. 4A-4F, the polymer matrix has been demonstrated to be continuous from scanning electron microscopy (SEM) images of an exemplary polymer bond abrasive article 4000a whereas a polymer bond abrasive article formed by a powder-based method does not have a continuous polymer matrix. A portion of an exemplary polymer bond abrasive article of Example 4 is seen in FIG. 4A at a 30× magnification, including a continuous polymer matrix 4100a and abrasive particles 4200a retained therein. In contrast, a portion of a comparative polymer bond abrasive article of Comparative Example 1 is seen in FIG. 4B at a 30× magnification, including a discontinuous polymer matrix 4100b and abrasive particles 4200b retained therein. FIGS. 4C and 4D show some of the exemplary polymer bond abrasive article 4000a and the comparative polymer bond abrasive article 4000b, respectively, each at a 200× magnification. The higher magnification provides an indication of the difference between a continuous polymer matrix 4100a and a discontinuous polymer matrix 4100b. FIGS. 4E and 4F show some of the exemplary polymer bond abrasive article 4000a and the comparative polymer bond abrasive article 4000b, respectively, each at a 1,200× magnification. This magnification shows the continuous polymer matrix 4100a of the exemplary polymer bond abrasive article 4000a and the discontinuous polymer matrix 4100b of the comparative polymer bond abrasive article 4000b.

The shape of any polymer bond abrasive article described herein is not particularly limited but will be designed to suit a particular abrading application. Several exemplary three-dimensional shapes of polymer bond abrasive articles are shown in FIGS. 5A-5K.

Figure 5A:
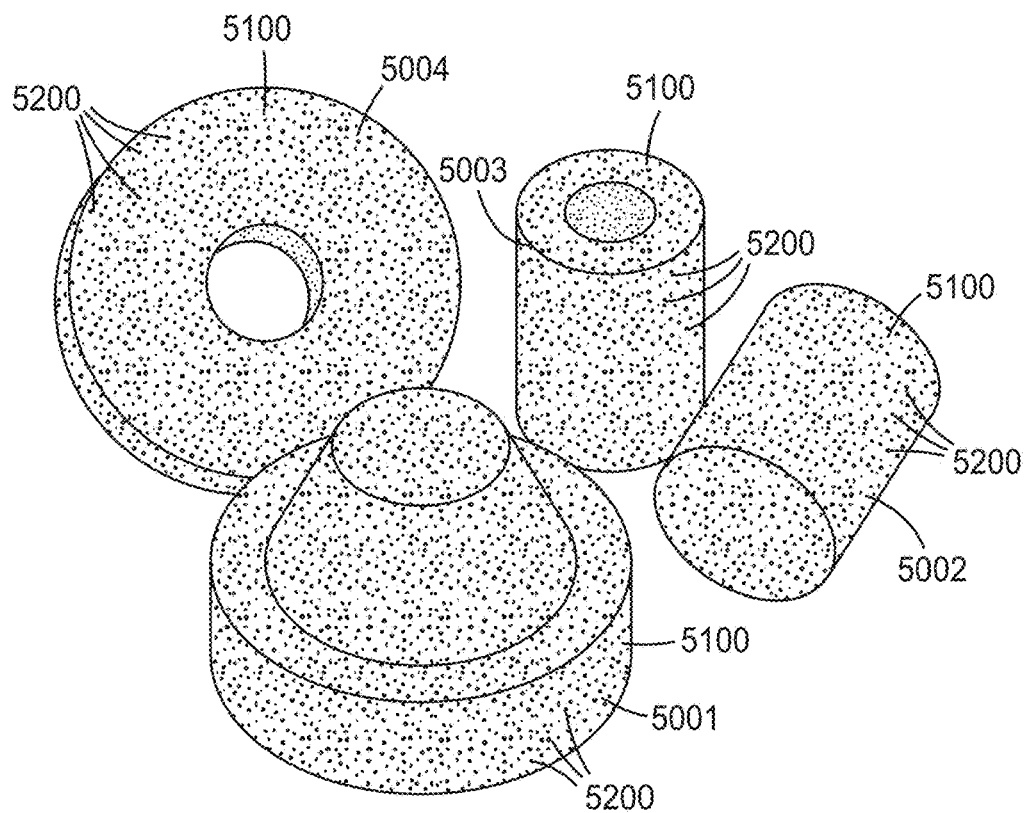
FIG. 5A is a schematic perspective view of four shapes of exemplary polymer bond abrasive articles, preparable according to the present disclosure.

FIG. 5A shows drawings of four exemplary polymer bond abrasive articles; an article 5001 having a truncated conical shape, an article 5002 having a cup shape, an article 5003 have a cylindrical shape, and an article 5004 having a disc shape. Each article (5001, 5002, 5003, 5004) comprises a continuous polymer matrix 5100 comprising abrasive particles 5200 dispersed therein.

Figure 5B:
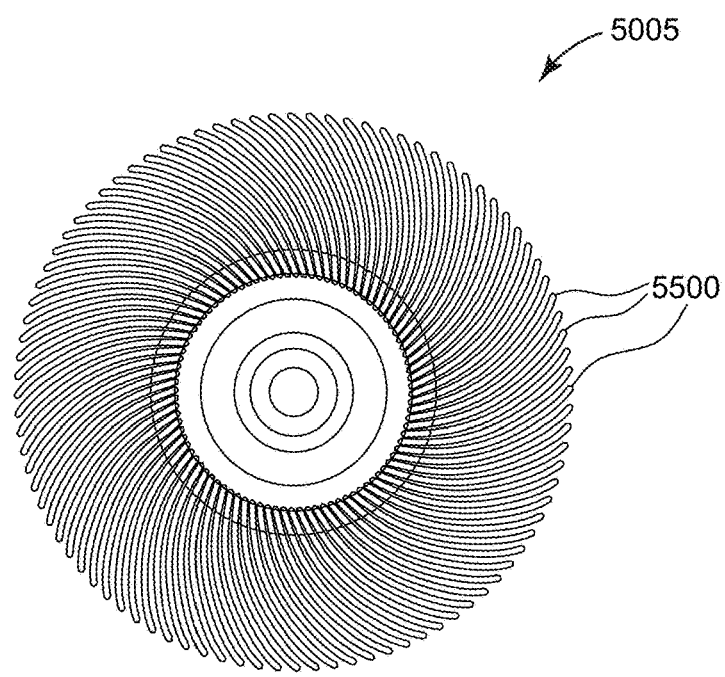
FIG. 5B is a schematic top view of an exemplary polymer bond abrasive article having a disc shape comprising radial bristles, preparable according to the present disclosure.

FIG. 5B shows an exemplary polymer bond abrasive article 5005 having a radial bristle disc shape. The bristles 5500 are formed of a continuous polymer matrix comprising abrasive particles retained therein.

Figure 5C:
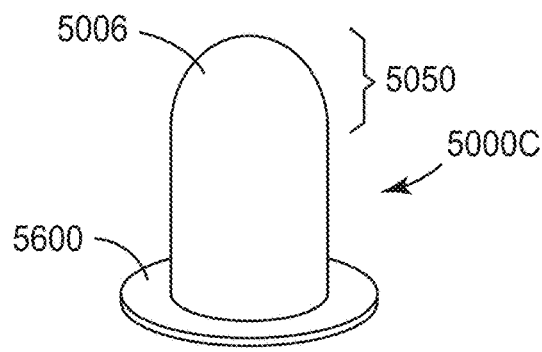
FIG. 5C is a schematic perspective view of an exemplary polymer bond abrasive article comprising a hemispherical shape, preparable according to the present disclosure

FIG. 5C shows an exemplary abrasive tool 5000C including a polymer bond abrasive article 5006 comprising a hemispherical shape 5050. The polymer bond abrasive article 5006 is affixed to a pad 5600.

Figure 5D:
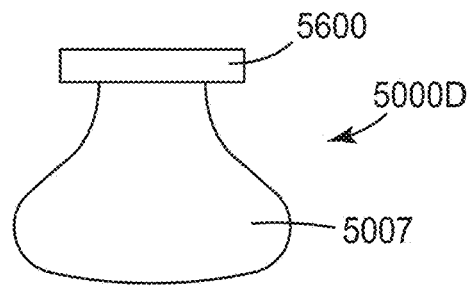
FIG. 5D is a schematic side view of an exemplary polymer bond abrasive article comprising a bulbous shape, preparable according to the present disclosure.

FIG. 5D shows an exemplary abrasive tool 5000D including a polymer bond abrasive article 5007 comprising a bulbous shape. The article 5007 is affixed to a pad 5600.

Figure 5E:
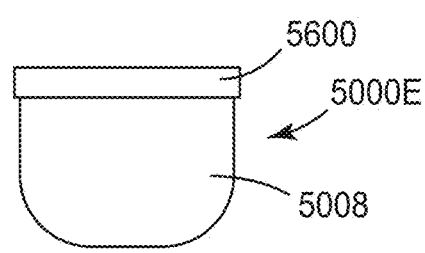
FIG. 5E is a schematic side view of an exemplary polymer bond abrasive article comprising a rounded cup shape, preparable according to the present disclosure.

FIG. 5E shows an exemplary abrasive tool 5000E including a polymer bond abrasive article 5008 comprising a rounded cup shape. The article 5008 is affixed to a pad 5600.

Figure 5F:
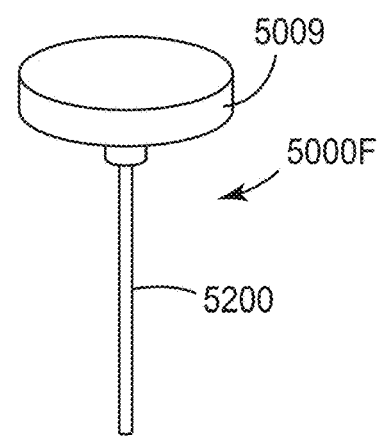
FIG. 5F is a schematic perspective view of an exemplary polymer bond abrasive article comprising a disc shape, preparable according to the present disclosure.

FIG. 5F shows an exemplary abrasive tool 5000F including a polymer bond abrasive article 5009 comprising a disc shape. The article 5009 is affixed to a shaft 5200.

Figure 5G:
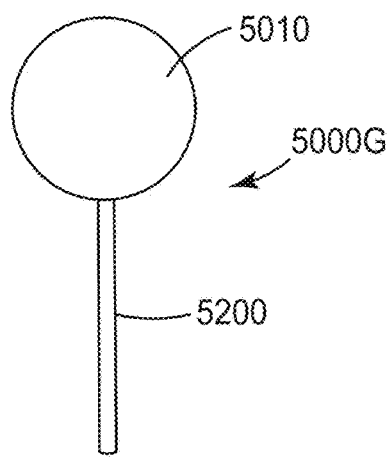
FIG. 5G is a schematic side view of an exemplary polymer bond abrasive article comprising a spherical shape, preparable according to the present disclosure.

FIG. 5G shows an exemplary abrasive tool 5000G including a polymer bond abrasive article 5010 comprising a spherical shape. The article 5010 is affixed to a shaft 5200.

Figure 5H:
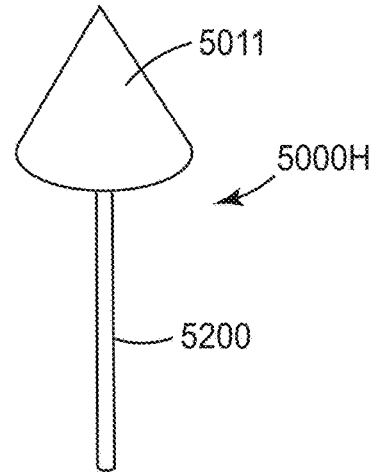
FIG. 5H is a schematic perspective view of an exemplary polymer bond abrasive article comprising a conical shape, preparable according to the present disclosure.

FIG. 5H shows an exemplary abrasive tool 5000H including a polymer bond abrasive article 5011 comprising a conical shape. The article 5011 is affixed to a shaft 5200.

FIG. 5I shows an exemplary polymer bond abrasive article 5012 comprising a cup shape. A surface 5700 of the polymer bond abrasive article 5012 comprises a three-dimensional pattern including arcuate recesses 5710. The article 5012 further defines an aperture 5720 that is configured to retain a shaft.

FIG. 5J shows an exemplary abrasive tool 5000J including a polymer bond abrasive article 5013 comprising a cylindrical shape comprising a plurality of separated substructures 5800. The article 5013 is affixed to a shaft 5200. The separated substructures are attached to the polymer bond abrasive article 5013 at one end 5810 of the polymer bond abrasive article 5013 and typically also an opposing end of the article 5013. Optionally, at least some of the separated substructures further comprise a three-dimensional pattern disposed on an exterior surface, which can assist in abrasion during use of the abrasive article.

FIG. 5K shows an exemplary polymer bond abrasive article 5014 having a disc shape and comprising a plurality of tortuous channels 5900.

Accordingly, a polymer bond abrasive article optionally comprises a cylindrical shape, a conical shape, a spherical shape, a disc shape, a cup shape, and/or a hemispherical shape. Further, the continuous photocured polymer matrix of any polymer bond abrasive article optionally defines one or more tortuous or arcuate channels, one or more architectural voids, one or more undercuts, one or more perforations, or combinations thereof.

Regarding any article described above, favorably a three-dimensional pattern may be disposed on at least a portion of an exterior surface of the polymer bond abrasive article. Suitable patterns include for instance and without limitation, an array of ridges, cubes, cuboids, posts, pyramids, truncated pyramids, cones, truncated cones, or any combination thereof. An array may have a regular repeating pattern and/or an irregular pattern of three-dimensional structures on an exterior surface of the polymer bond abrasive article.

Abrasive materials as used herein have (exhibit) a Mohs hardness of 8 or greater or comprise chemical-mechanical abrasive compositions. Suitable abrasive particles may comprise any abrasive particle used in the abrasives industry. Preferably, the abrasive particles have a Mohs hardness of 8.5 or greater, more preferably 9 or greater, and most preferably 9-10. In certain embodiments, the abrasive particles comprise superabrasive particles. As used herein, the term "superabrasive" refers to any abrasive particle having a hardness greater than or equal to that of silicon carbide (e.g., silicon carbide, boron carbide, cubic boron nitride, and diamond).

Chemical-mechanical abrasive compositions combine a chemical reaction to soften the surface layer and then a mechanical force to remove the softened layer. Suitable components for chemical mechanical polishing (CMP) include silica-based particles, ceria-based particles and alumina-based particles. In addition to the particles, an aqueous medium is required to achieve CMP. The aqueous medium is primarily water based and can have additives including pH adjusters, dispersants, additive, oxidizers or passivation agents. These additives may not be required and are specific to the materials being abraded and the particles used for the mechanical force.

Typically, the abrasive particles comprise at least one of diamond particles, metal oxide ceramic particles, or non-oxide ceramic particles. Examples of suitable abrasive particles include for instance and without limitation, cubic boron nitride, fused aluminum oxide, ceramic aluminum oxide, heat treated aluminum oxide, white fused aluminum oxide, black silicon carbide, green silicon carbide, titanium diboride, boron carbide, silicon nitride, tungsten carbide, titanium carbide, diamond, cubic boron nitride, hexagonal boron nitride, alumina zirconia, iron oxide, ceria, garnet, fused alumina zirconia, alumina-based sol gel derived abrasive particles and the like. The alumina abrasive particle may contain a metal oxide modifier. The diamond and cubic boron nitride abrasive particles may be mono crystalline or polycrystalline. Examples of sol-gel derived abrasive particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.).

The abrasive particles may comprise abrasive agglomerate particles. Abrasive agglomerate particles typically comprise a plurality of abrasive particles, a binder, and optional additives. The binder may be organic and/or inorganic. Abrasive agglomerates may be randomly shape or have a predetermined shape associated with them. Optionally, abrasive agglomerates comprise ceramic abrasive agglomerates that comprise individual abrasive particles dispersed in a porous ceramic matrix, in which at least a portion of the porous ceramic matrix comprises glassy ceramic material. Agglomerate abrasive particles that comprise finer abrasive particles in a vitreous bond matrix can be as described in U.S. Pat. No. 6,551,366 (D'Souza et al.).

Further, inorganic particles exhibiting a Mohs hardness less than 8 may also be included with the abrasive particles, for instance silica, iron oxide, chromia, ceria, zirconia, titania, tin oxide, gamma alumina, garnet, and the like.

Favorably, any polymer bond abrasive article of the present disclosure comprises abrasive particles comprising at least one of cubic boron nitride, silicon carbide, titanium diboride, titanium nitride, boron carbide, tungsten carbide, titanium carbide, aluminum nitride, diamond, fused alumina-zirconia, sol-gel derived abrasive particles, or silicon nitride particles. The abrasive particles according to the present disclosure typically include ground abrasive particles, crushed abrasive particles, shaped abrasive particles, precisely shaped abrasive particles, abrasive platelets, abrasive rods, shaped agglomerates of abrasive particles, or combinations thereof. In certain embodiments, the abrasive particles comprise agglomerates of abrasive particles, or combinations thereof. In any embodiment, the abrasive particles optionally are free of surface modification.

In certain embodiments, the abrasive particles have an average particle size (i.e., largest dimension) of 0.5 micrometers or greater, 1 micrometer or greater, 2 micrometers or greater, 3 micrometers or greater, 4 micrometers or greater, 5 micrometers or greater, 6 micrometers or greater, 7 micrometers or greater, 8 micrometers or greater, 9 micrometers or greater, 10 micrometers or greater, 12 micrometers or greater, 15 micrometers or greater, 18 micrometers or greater, 20 micrometers or greater, or 25 micrometers or greater; and an average particle size of 100 micrometers or less, 90 micrometers or less, 80 micrometers or less, 70 micrometers or less, 60 micrometers or less, 50 micrometers or less, 40 micrometers or less, 30 micrometers or less, or 20 micrometers or less. Stated another way, an average particle size may range from 0.5 micrometers to 100 micrometers or 0.5 micrometers to 50 micrometers.

Typically, polymer bond abrasive articles (and photocurable compositions for making the abrasive articles) according to the present disclosure comprise 0.1 volume percent (vol. %) or greater of the abrasive particles, based on the total volume of the polymer bond abrasive article (or photocurable composition), 0.2 vol. % or greater, 0.5 vol. % or greater, 0.8 vol. % or greater, 1.0 vol. % or greater, 1.5 vol. % or greater, 2.0 vol. % or greater, 3.0 vol. % or greater, 4.0 vol. % or greater, 5.0 vol. % or greater, 6.0 vol. % or greater, 8.0 vol. % or greater, 10.0 vol. % or greater, 12.5 vol. % or greater, 15.0 vol. % or greater, 17.5 vol. % or greater, 20.0 vol. % or greater, 22.5 vol. % or greater, 25.0 vol. % or greater, 27.5 vol. % or greater, or 30.0 vol. % or greater; and 70.0 vol. % or less of the abrasive particles, based on the total volume of the polymer bond abrasive article (or photocurable composition), 65.0 vol. % or less, 62.5 vol. % or less, 60.0 vol. % or less, 57.5 vol. % or less, 55.0 vol. % or less, 52.5 vol. % or less, 50.0 vol. % or less, 47.5 vol. % or less, 45.0 vol. % or less, 42.5 vol. % or less, 40.0 vol. % or less, 37.5 vol. % or less, 35.0 vol. % or less, or 32.5 vol. % or less, of the abrasive particles, based on the total volume of the polymer bond abrasive article. Stated another way, polymer bond abrasive articles (or photocurable compositions) may comprise 0.1 vol. % to 70 vol. %, 1.0 vol. % to 50.0 vol. %, or 2.0 vol. % to 25.0 vol. % of the abrasive particles, based on the total volume of the polymer bond abrasive article.

Typically, polymer bond abrasive articles (and photocurable compositions for making the abrasive articles) according to the present disclosure comprise 0.5 weight percent (wt. %) or greater of the abrasive particles, based on the total weight of the polymer bond abrasive article (or photocurable composition), 0.8 wt. % or greater, 1.0 wt. % or greater, 2.0 wt. % or greater, 3.0 wt. % or greater, 4.0 wt. % or greater, 5.0 wt. % or greater, 8.0 wt. % or greater, 10.0 wt. % or greater, 15.0 wt. % or greater, 20.0 wt. % or greater, 25.0 wt. % or greater, 30.0 wt. % or greater, 35.0 wt. % or greater, 40.0 wt. % or greater, 45.0 wt. % or greater, 50.0 wt. % or greater, or 55.0 wt. % or greater, based on the total weight of the polymer bond abrasive article; and 80 wt. % or less of the abrasive particles, based on the total weight of the polymer bond abrasive article (or photocurable composition), 75 wt. % or less, 70 wt. % or less, 65 wt. % or less, 60 wt. % or less, 55 wt. % or less, 50 wt. % or less, or 45 wt. % or less, based on the total weight of the polymer bond abrasive article (or photocurable composition). Stated another way, polymer bond abrasive articles (or photocurable compositions) may comprise 0.5 wt. % to 70 wt. %, 1.0 wt. % to 55 wt. %, or 0.5 wt. % to 45 wt. % of the abrasive particles, based on the total weight of the polymer bond abrasive article (or photocurable composition).

Optical brighteners compete with photoinitiators for light absorption, thereby limiting overexposure and/or blurring in order to enhance resolution. Optical brighteners are chemical compounds that absorb light in the ultraviolet and violet region (usually 340-370 nanometers (nm)) of the electromagnetic spectrum, and re-emit light in the blue region (typically 420-470 nm) by fluorescence. Useful optical brighteners are commercially available under the trade designation "BENETEX OB-Ml" from Mayzo, Inc. (Suwanee, GA) and under the trade designation "TINOPAL CBS" from BASF (Ludwigshafen, Germany). The optical brightener may also help to limit the penetration of the irradiation from the energy source through the curable composition and to contain the cure reaction to localized areas.

Light absorbers may include at least one UV absorber, visible light absorber, or any combination thereof. Suitable examples of organic UV absorbers include benzophenones, benzotriazoles, benzoxazinones and triazines. The light absorber optionally comprises a light stabilizer, preferably a hindered amine light stabilizer (HALS), typically having a hindered piperidine skeleton in the molecule. Specific examples of HALS include bis-(2,2,6,6-tetramethyl-4-piperidyl)sebacate, bis-(N-methyl-2,2,6,6-tetramethyl-4-piperidyl)sebacate, bis-(1,2,2,6,6-pentamethyl-4-piperidyl)sebacate, 1,2,2,6,6-pentamethyl-4-piperidyl-tridecyl-1,2,3,4-butanetetracarboxylate-, tetrakis-(2,2,6,6-tetramethyl-4-piperidyl)-1,2,3,4-butanetetracarboxylate, and tetrakis-(N-methyl-2,2,6,6-tetramethyl-4-piperidyl)-1,2,3,4-butanetetracarboxylate.

Suitable visible light absorbers should be capable of light absorption somewhere within the range of wavelength between about 400 nm and about 700 nm. They may be selected from ketones, coumarin dyes (e.g., ketocoumarins), xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriaryl methanes, merocyanines, squarylium dyes and pyridinium dyes. Preferably, the visible light absorber is an alpha-diketone; camphorquinone is particularly preferred and commercially available from Sigma-Aldrich.

Typically, the optical brightener and/or the light absorber is present in an amount of greater than 0.01 weight percent (wt. %), based on the total weight of the photocured polymer matrix. The amount is the total of both the optical brightener and the light absorber if both are present, or the amount of just one of the optical brightener or the light absorber if only one is present. In some embodiments, an initiator and either an optical brightener or a light absorber is present at a molar ratio of 17 or greater initiator:1 optical brightener or light absorber; 20 or greater:1; 25 or greater:1; 30 or greater:1; 35 or greater:1; 40 or greater:1; 45 or greater:1; 50 or greater:1; 55 or greater:1; 60 or greater:1; or 65 or greater initiator:1 optical brightener or light absorber; and 72 or less initiator:1 optical brightener or light absorber; 68 or less:1; 64 or less:1; 61 or less:1; 58 or less:1; 54 or less:1; 51 or less:1; 48 or less:1; 44 or less:1; 41 or less:1; or 38 or less initiator:1 optical brightener or light absorber. Stated another way, an initiator and either an optical brightener or a light absorber may be present at a molar ratio of 17:1 initiator to 72:1 optical brightener or light absorber. In select embodiments, an optical brightener is favorably present to assist in controlling depth of penetration of actinic radiation into the photocurable composition.

Regarding polymer bond abrasive articles, photocurable compositions generally include one or more organic thermosetting components (e.g., monomers and oligomers), typically containing one or more additive(s) such as, for example, fillers, curatives (e.g., free-radical initiators (photo- or thermal), antioxidants, and/or light stabilizers.

Data representing an article (e.g., a polymer bond abrasive article) may be generated using computer modeling, such as computer aided design (CAD) data. Image data representing the article design can be exported in STL format, or in any other suitable computer processable format, to the additive manufacturing equipment. Scanning methods to scan a three-dimensional object may also be employed to create the data representing the article. One exemplary technique for acquiring the data is digital scanning. Any other suitable scanning technique may be used for scanning an article, including X-ray radiography, laser scanning, computed tomography (CT), magnetic resonance imaging (MRI), and ultrasound imaging. Other possible scanning methods are described, e.g., in U.S. Patent Application Publication No. 2007/0031791 (Cinader, Jr., et al.). The initial digital data set, which may include both raw data from scanning operations and data representing articles derived from the raw data, can be processed to segment an article design from any surrounding structures (e.g., a support for the article).

Figure 10:
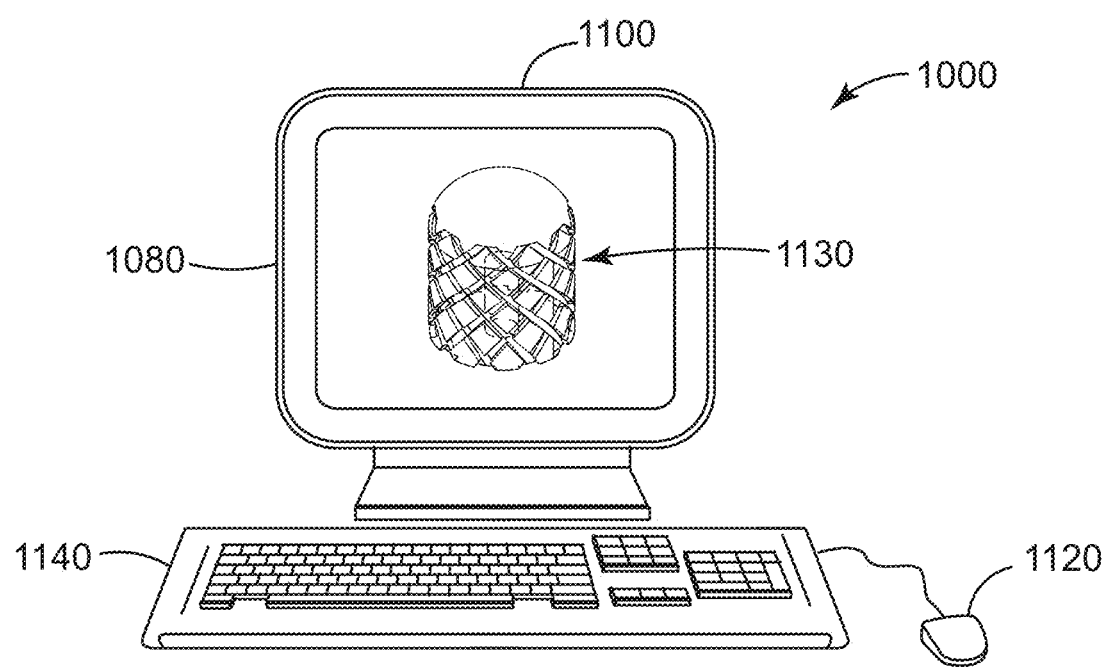
FIG. 10 is a schematic front view of an exemplary computing device 1000.

Often, machine-readable media are provided as part of a computing device. The computing device may have one or more processors, volatile memory (RAM), a device for reading machine-readable media, and input/output devices, such as a display, a keyboard, and a pointing device. Further, a computing device may also include other software, firmware, or combinations thereof, such as an operating system and other application software. A computing device may be, for example, a workstation, a laptop, a personal digital assistant (PDA), a server, a mainframe or any other general-purpose or application-specific computing device. A computing device may read executable software instructions from a computer-readable medium (such as a hard drive, a CD-ROM, or a computer memory), or may receive instructions from another source logically connected to computer, such as another networked computer. Referring to FIG. 10, a computing device 1000 often includes an internal processor 1080, a display 1100 (e.g., a monitor), and one or more input devices such as a keyboard 1140 and a mouse 1120. In FIG. 10, an article 1130 (e.g., a polymer bond abrasive article) is shown on the display 1100.

Figure 6:
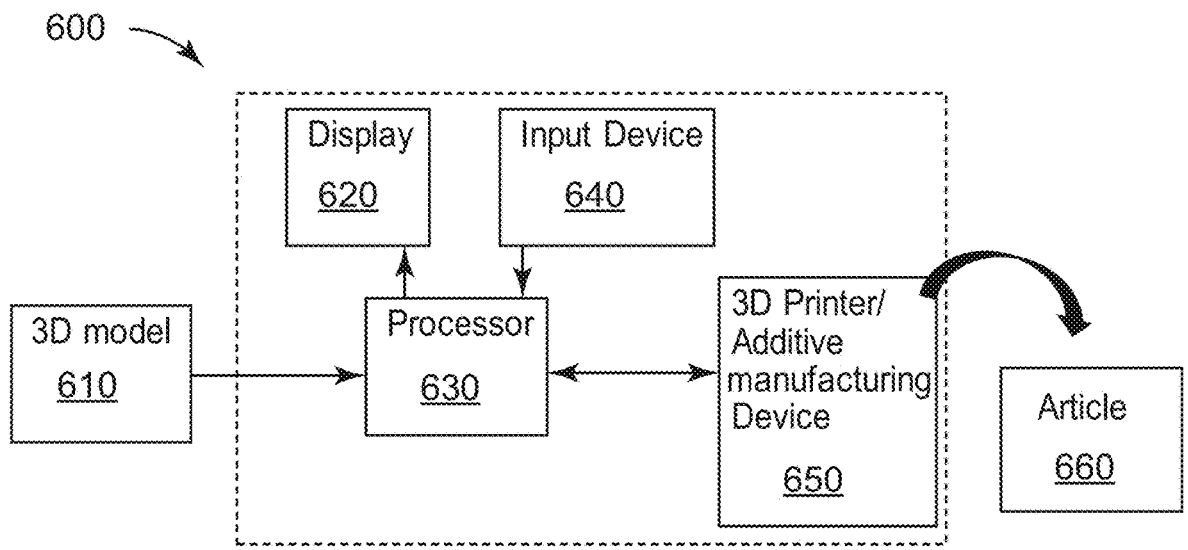
FIG. 6 is a block diagram of a generalized system 600 for additive manufacturing of an article.

Referring to FIG. 6, in certain embodiments, the present disclosure provides a system 600. The system 600 comprises a display 620 that displays a 3D model 610 of an article (e.g., an article 1130 as shown on the display 1100 of FIG. 10); and one or more processors 630 that, in response to the 3D model 610 selected by a user, cause a 3D printer/additive manufacturing device 650 to create a physical object of the article 660. Often, an input device 640 (e.g., keyboard and/or mouse) is employed with the display 620 and the at least one processor 630, particularly for the user to select the 3D model 610. The article 660 comprises a polymer bond abrasive article formed of a continuous photocured polymer matrix comprising abrasive particles retained therein, wherein the polymer bond abrasive article has a three-dimensional shape.

Figure 7:
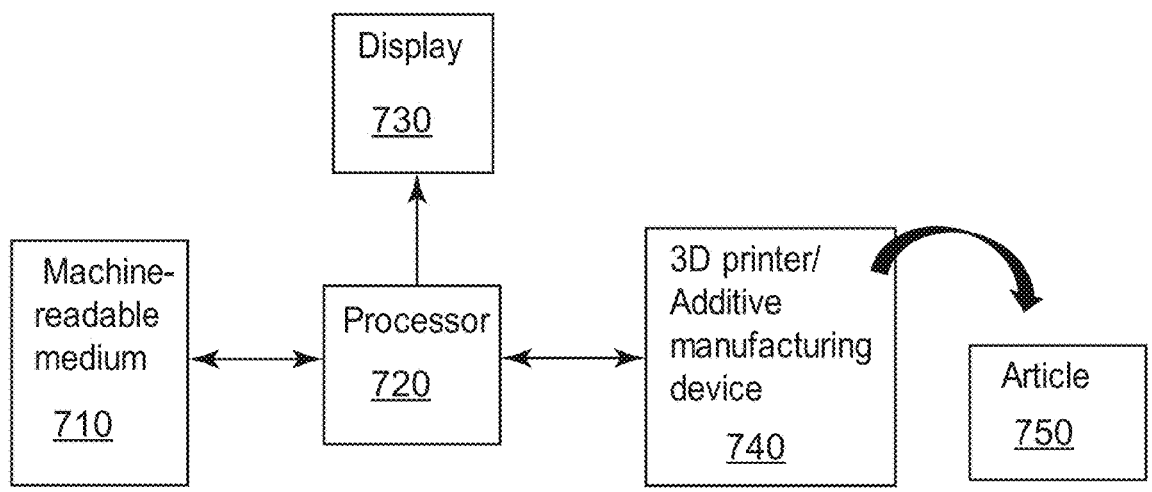
FIG. 7 is a block diagram of a generalized manufacturing process for an article.

Referring to FIG. 7, a processor 720 (or more than one processor) is in communication with each of a machine-readable medium 710 (e.g., a non-transitory medium), a 3D printer/additive manufacturing device 740, and optionally a display 730 for viewing by a user. The 3D printer/additive manufacturing device 740 is configured to make one or more articles 750 based on instructions from the processor 720 providing data representing a 3D model of the article 750

(e.g., an article 1130 as shown on the display 1100 of FIG. 10) from the machine-readable medium 710.

After an article has been formed, it is typically removed from the additive manufacturing apparatus, and at least some liquid dispersion containing uncured photocurable monomer is removed from the surface of the article, such as by using mass inertial force or washing, as described above. At this stage, the three-dimensional article typically has sufficient green strength for handling in any remaining steps of the method. The article surface, as well as the bulk article itself, typically still retain uncured material, suggesting a need for further curing. Removing residual uncured photocurable component is particularly useful when the article is going to subsequently be post-cured, to minimize uncured residual material from undesirably curing directly onto the article. A "cured" article can comprise at least one photocurable component (e.g., monomer, oligomer, polymer, etc.) that has been at least partially polymerized and/or cross-linked. For instance, in some instances, an at least partially polymerized article is at least about 10% polymerized or crosslinked or at least about 30% polymerized or crosslinked. In some cases, an at least partially polymerized article is at least about 50%, at least about 70%, at least about 80%, or at least about 90% polymerized or crosslinked, for instance between about 10% and about 99% polymerized or crosslinked. Some components may not be reacted at all during this (initial) curing stage.

Further curing can be accomplished by further irradiating with actinic radiation, heating, or both. Exposure to actinic radiation can be accomplished with any convenient radiation source, generally UV radiation, visible radiation, and/or e-beam radiation, for a dose of at least 1 Joules per square centimeter ($J/cm^2$), or equivalent. Heating is generally carried out at a temperature in the range of about 35-120° C., for a duration of at least 10 minutes and optionally in an inert atmosphere. So called post-cure ovens, which combine UV radiation and thermal energy, are particularly well suited for use in the post-cure process(es). In general, post curing improves the mechanical properties and stability of the three-dimensional article relative to the same three-dimensional article that is not post cured.

Figure 8:
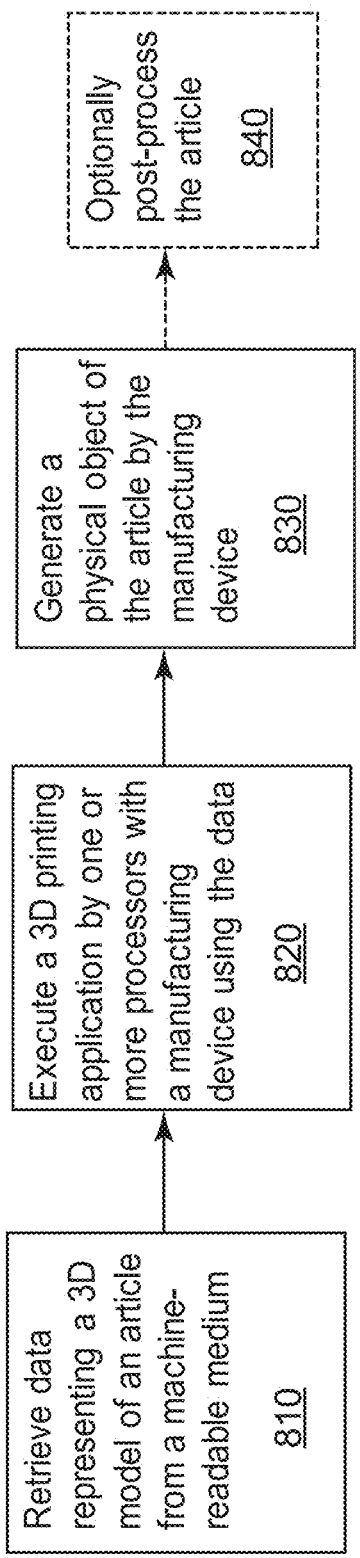
FIG. 8 is a high-level flow chart of an exemplary article manufacturing process.

Referring to FIG. 8, for example and without limitation, an additive manufacturing method comprises retrieving 810, from a (e.g., non-transitory) machine-readable medium, data representing a 3D model of an article (e.g., a polymer bond abrasive article) according to at least one embodiment of the present disclosure. The method further includes executing 820, by one or more processors, an additive manufacturing application interfacing with a manufacturing device using the data; and generating 830, by the manufacturing device, a physical object of the article. One or more various optional post-processing steps 840 may be undertaken. Typically, uncured photocurable component is removed from the article, plus the article may further be heat treated and/or sintered.

Figure 9:
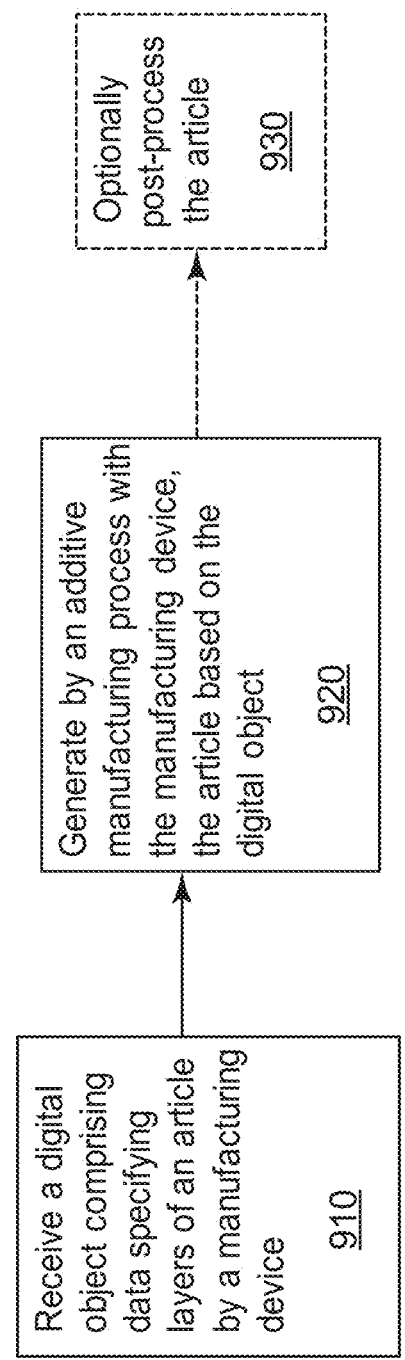
FIG. 9 is a high-level flow chart of an exemplary article additive manufacturing process.

Additionally, referring to FIG. 9, a method of making an article comprises receiving 910, by a manufacturing device having one or more processors, a digital object comprising data specifying a (e.g., polymer bond abrasive) article; and generating 920, with the manufacturing device by an additive manufacturing process, the article based on the digital object. Again, the article may undergo one or more steps of post-processing 930.

In some embodiments, the photocured polymer matrix comprises a reaction product of at least one monomer, oligomer, or polymer selected from ethylenically unsaturated monomers and/or oligomers, oxirane monomers and/or oligomers, oxetane monomers and/or oligomers, cyclic olefin monomers and/or oligomers, or thiol-ene monomers and/or oligomers. In select embodiments, the photocured polymer matrix comprises a reaction product of a (meth) acrylate monomer and at least one of an epoxy monomer or a cyclic olefin monomer.

Representative examples of ethylenically unsaturated monomers include mono-, di- or poly-acrylates and methacrylates such as methyl acrylate, methyl methacrylate, ethyl acrylate, isopropyl methacrylate, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-thoxyphenyldimethylmethane, bis[1-(3-acryloxy-2-hydroxy)]-p-propoxyphenyldimethylmethane, trishydroxyethyl-isocyanurate triacrylate; the bis-acrylates and bis-methacrylates of polyethylene glycols of molecular weight 200-500, copolymerizable mixtures of acrylated monomers such as those of U.S. Pat. No. 4,652,274, and acrylated oligomers such as those of U.S. Pat. No. 4,642,126; unsaturated amides such as methylene bis-acrylamide, methylene bis-methacrylamide, 1,6-hexamethylene bis-acrylamide, diethylene triamine trisacrylamide and beta-methacrylaminoethyl methacrylate; and vinyl compounds such as styrene, N-vinyl pyrrolidone, N-vinyl caprolactam, diallyl phthalate, vinyl esters (e.g., vinyl acetate, vinyl propionate, divinyl succinate, and divinyl adipate) and divinylphthalate. Mixtures of two or more monomers can be used if desired.

A wide variety of (meth)acrylate monomers, are readily commercially available, for example, from such vendors as Sartomer Company (Exton, PA). Exemplary acrylate monomers include ethylene glycol di(meth)acrylate, hexanediol di(meth)acrylate, triethylene glycol di(meth)acrylate, trimethylolpropane tri(meth)acrylate, glycerol tri(meth)acrylate, pentaerythritol tri(meth)acrylate, ethoxylated trimethylolpropane tri(meth)acrylate, neopentyl glycol di(meth) acrylate, pentaerythritol tetra(meth)acrylate, dipentaerythritol penta(meth)acrylate, sorbitol tri(meth)acrylate, sorbitol hexa(meth)acrylate, Bisphenol A di(meth)acrylate, ethoxylated Bisphenol A di(meth)acrylates, tris-(2-hydroxy ethyl) isocyanurate triacrylate marketed by Sartomer company as SR368D and mixtures thereof. Additional useful polyfunctional (meth)acrylate oligomers include polyether oligomers such as a polyethylene glycol 200 diacrylate marketed by Sartomer Company as SR 259; and polyethylene glycol 400 diacrylate marketed by Sartomer Company as SR 344.

Useful high viscosity oligomers include compounds exhibiting a viscosity of 40 Pascal seconds (Pas) or greater, 50 Pas or greater, 75 Pas or greater, 100 Pas or greater, or 150 Pas or greater. Typically, the viscosity is 1,000 Pas or less. At least one high viscosity oligomer may be included in the photocurable composition, for instance to assist in keeping the abrasive particles dispersed in the composition. Suitable oligomers include those described in detail as compound (A) in PCT Publication No. WO2012/003136 (Eckert et al.). For instance, in one embodiment compound (A) has the following features: only one backbone unit (U) with 6 to 20 carbon atoms, at least 6 carbon atoms thereof forming an aromatic or an aliphatic cyclic moiety, the remaining carbon atoms either being part of substituents pending from the cyclic moiety or being part of bridging groups to spacer units, wherein one or more of the remaining carbon atoms can be replaced by an oxygen atom, the backbone unit not comprising a bisphenol structure and preferably no halogen atoms, one or two unit(s) (S) being connected to the backbone unit (U) via an ether linkage, at least one unit (S) comprising a —$CH_2$—$CH_2$—$CH_2$— $CH_2$—O—$CH_2$—CH(Q)-OG moiety or a —$CH_2$—CH(OG)-$CH_2$-OM moiety or a mixture of these two types of moieties within one unit (S), with G comprising at least one polymerizable moiety and an urethane moiety, the urethane moiety acting as connecting element to unit(s) (S), and M comprising at least one group selected from acroyl, methacroyl, aryl, mixtures and combinations thereof, Q comprising at least one group selected from hydrogen, methyl, phenyl, phenoxymethyl, mixtures and combinations thereof, and with the proviso that onto the backbone unit (U) at least two substituents are attached, each bearing at least one group G, wherein in the case where only one unit (S) is present, the group G not being part of said unit (S) is located in the further substituent pending from unit (U).

If desired, the viscosity can be measured with a Haake RotoVisco RV1 device (rotor C60/1 for viscosities up to 8000 mPas or rotor C20/1 for viscosities above 8000 mPas together with stator P61). The viscosity is typically measured at 23.0° C. between two plane and parallel plates (i.e., stator and rotor). After activation and rectification of the system, the appropriate rotor is installed. Then the rotor is lowered and the distance between stator and rotor is adjusted to 0.052 mm (using Software RheoWin Pro Job Manager Software Version 2.94) for the viscosity measurement. Then the rotor is lifted and the material to be measured is given onto the stator (1.0 ml with rotor C60/1 or 0.04 ml with rotor C20/1). Without undue delay, the rotor is lowered into the preliminary adjusted measuring position. The material to be measured is tempered at 23.0° C. The shear rate for the measurement has to be adjusted to a value that the torque is at least 5000 µNm (therefore normally shear rates of 100, 200, 500, or 1000 $s^{-1}$ are used depending on the viscosity of the material to be measured). The measurement is started and run for 60 seconds. The viscosity values (Pa·s) are recorded starting 20 seconds after the start of measurement and the mean value of the recorded values is given as viscosity.

Useful oxirane monomers and oligomers can include mono-, di- or poly-functional glycidyl ethers, such as those prepared by reacting a monohydric, or a polyhydric alcohol, or a polydric phenol with epichlorohydrin. Examples of monohydric alcohols may include methanol, ethanol, 2-ethylhexanol, 1-dodecanol. Examples of polyhydric alcohols may include butanediol, polyethylene glycol, and glycerin. Examples of a polyhydric phenol may include a bisphenol A, bisphenol F, bisphenol AD, catechol, or resorcinol.

Useful oxirane monomers and oligomers include commercially available epoxy compounds such as octadecylene oxide, glycidyl methacrylate, bis(3,4-epoxycyclohexylmethyl) adipate (Syna Epoxy 28 from Synasia), difunctional bisphenol A/epichlorohydrin (Epon 828 from Hexion Specialty Chemicals GmbH, Rosbach, Germany).

Useful oxirane compounds also include glycidyl esters and polyglycidyl esters. A polyglycidyl ether may be obtained by reacting a polycarboxylic acid with epichlorohydrin. Such polycarboxylic acids may include a dimer acid (e.g., RADIACID 0950 from Oleon, Simpsonville, SC), and a trimer acid (e.g., RADIACID 0983 from Oleon). Suitable glycidyl esters include a glycidyl ester of neodecanoic acid (e.g., ERISYS GS-110 from CVC Specialty Chemicals) and a glycidyl ester of a dimer acid (e.g., DRISYS GS-120 from CVC Specialty Chemicals).

Useful oxetane monomers include xylylene bis-oxetane, 3,3'-(oxybis(methylene))bis(3-ethyloxetane), 1,4-bis[(3-ethyl-3-oxetanylmethoxy)methyl]benzene, 3-ethyl-3-phenoxymethyloxetane, bis[{1-ethyl (3-oxetanyl)}methyl] ether, 2-ethyl-3{[(3-ethyl oxetan-3-yl)methyhoxy]methyl}oxetane, 3-ethyl-3-hydroxymethyl oxetane (oxetane alcohol), 4,4'-bis[(3-ethyl oxetan-3-yl)methoxy]methylbiphenyl, or any combination thereof. Several oxetane monomers are commercially available from Nagase America LLC (New York, NY).

Useful cyclic olefin monomers include norbornylene, ethylidenenorbornene, cyclopentene, cyclooctene, dicyclopentadiene, tricyclopentadiene, tetracyclopentadiene, norbornadiene, 7-oxobicyclo[2.2.1]hept-2-ene, tetracyclo[6,2,13,6,0$^{2,7}$]dodeca-4,9-diene, and derivatives thereof with substituents including aliphatic groups, aromatic groups, esters, amides, ethers, and silanes.

Useful thiol-ene monomers include an alkylene, arylene, alkylarylene, arylalkylene, or alkylenearylalkylene having at least one —SH group.

During curing, thermosetting compounds develop a covalently crosslinked bond network that hardens and strengthens the resulting polymer bond material.

Advantageously, methods according to at least certain embodiments of the present disclosure are suitable for manufacturing various bonded abrasive articles that cannot be readily or easily fabricated by other methods. For example, inclusion of (internal) architectural voids is possible as long as an opening to the exterior of the abrasive preform exists for removal of uncured composition. Accordingly, cooling channels having tortuous and or arcuate paths can be readily manufactured using methods of the present disclosure. Cooling channels are open to the exterior of the bonded abrasive article. In some embodiments, they have a single opening, but more typically they have two or more openings. A cooling medium (e.g., air, water, emulsion, or oil) circulates through the cooling channel(s) to remove heat generated during the abrading process. Accordingly, the present disclosure provides a bonded abrasive article optionally comprising at least one of: at least one tortuous cooling channel extending at least partially through the polymer bond abrasive article; at least one arcuate cooling channel extending at least partially through the polymer bond abrasive article.

Regarding any of the polymer bond abrasive articles described above, the continuous photocured polymer matrix is optionally formed of a plurality of layers. In such embodiments, each of the plurality of layers has an average thickness of 10 micrometers or greater, 20 micrometers or greater, 30 micrometers or greater, 40 micrometers or greater, 50 micrometers or greater, 60 micrometers or greater, 70 micrometers or greater, 80 micrometers or greater, or 90 micrometers or greater; and an average thickness of 150 micrometers or less, 140 micrometers or less, 130 micrometers or less, 120 micrometers or less, 110 micrometers or less, or 100 micrometers or less. Preferably, a layer thickness is greater than a D99 of the largest abrasive particles in the composition.

In certain embodiments, the polymer bond abrasive article is selected from the group consisting of an abrasive grinding bit, an abrasive polishing bit, an abrasive rim, an abrasive pad, and an abrasive wheel, as well as many hitherto unknown polymer bond abrasive articles.

EXAMPLES

Unless otherwise noted or apparent from the context, all parts, percentages, ratios, etc. in the Examples and the rest of the specification are by weight.

TABLE 1

Materials List

| DESIGNATION | DESCRIPTION | SOURCE |
|---|---|---|
| SR368D | Tris(2-hydroxylethyl) isocyanurate triacrylate | Sartomer, Exton, PA |
| SR399 | Dipentaerythritol Pentaacrylate | Sartomer |
| SR351LV | Low Viscosity Trimethylolpropane Triacrylate | Sartomer |
| SR506C | Isobornyl Acrylate | Sartomer |
| ERGP-DMA | Ethanol, 2,2'-[1,3-phenylenebis (oxy)] bis-, polymer with 2-(phenoxymethyl) oxirane, bis [N-[2-[(2-methyl-1-oxo-2-propen-1-yl) oxy] ethyl] carbamate] | Prepared as described in WO2012/003136, pg. 52, line 10 |
| Solplus R700 | Organic polyurethane dispersant | Lubrizol, Wickliffe, OH |
| Filler-1 | Cubic Diamond & Glass Agglomerate, 1 um | Preparatory Example 1 |
| Filler-2 | Cerox 1670 ceria particles | Solvay, Belgium, Brussels |
| Filler-3 | 9 micron diamond agglomerates (012116-SD1) | 3M Company, St. Paul, MN |
| TPO | 2,4,6-trimethylbenzoyldiphenylphosphine oxide photoinitiator obtained as "IRGACURE TPO" | BASF, Ludwigshafen, Germany |
| CPQ | Camphorquinone | Sigma-Aldrich, St. Louis, MO |
| EDMAB | Ethyl-4-dimethylamino benzoate | Alfa Aesar, Haverhill, MA |
| DPIHFP | Diphenyliodonium hexafluorophosphate | Alfa Aesar |
| BHT | 2,6-di-t-butyl-4-methylphenol, inhibitor | Alfa Aesar |
| OB | Tinopal OB | BASF |
| V-88 | 1,1'-Azobis(cyclohexanecarbonitrile) | Sigma-Aldrich |
| PU-1 | X2006-NAT-025PWD | Lubrizol |
| BS-004 | PM-B-SR1-04 binder | ExOne, Irwin, PA |
| MCD1 | 1 micrometer nanocrystalline diamond particles | Diamond Innovations, Worthington, OH |
| Standex230 | Dextrin obtained as "STANDEX 230" | A.E. Staley Manufacturing Company, Decatur, IL |
| GF | Glass frit having a particle size of about 10.6 micrometers as determined by laser light scattering, obtained as "SP 1086" | Specialty Glass, Inc., Oldsmar, FL |
| AlOx | 3 micrometer plated white alumina, used as a parting agent, obtained as "PWA 3". | Fujimi Inc., Kiyosu, Japan |

TABLE 2

Resin Formulations

| | EX-1 | EX-2 | EX-3 | EX-4 | EX-5 | EX-6 | CE-1 |
|---|---|---|---|---|---|---|---|
| SR368D (parts) | 70 | 63 | 48 | 54 | | | 54 |
| SR399 (parts) | | | | | 27.7 | | |
| SR351LV (parts) | | | | | 15.7 | | |
| SR506C (parts) | | | | | 11.0 | | |
| ERGP-DMA (parts) | | 7 | 12 | 6 | | | 6 |
| Solplus R700 (parts) | | | | | 2.2 | | |
| Filler-1 (parts) | 30 | 30 | 40 | 40 | | | 40 |
| Filler-2 (parts) | | | | | 43.5 | | |
| Filler-3 (parts) | | | | | | 33 | |
| PU-1 (parts) | | | | | | 67 | |
| TPO (phr) | 0.70 | 0.63 | 0.48 | 0.54 | | | 0.6 |
| CPQ (phr) | | | | | 0.16 | | |
| EDMAB (Phr) | | | | | 0.60 | | |
| DPIHFP (Phr) | | | | | 0.16 | | |
| BHT (phr) | 0.049 | 0.044 | 0.034 | 0.038 | 0.11 | | 0.042 |
| OB (phr) | 0.049 | 0.044 | 0.034 | 0.038 | | | 0.042 |
| V-88 (phr) | | | | 0.30 | | | |

Preparatory Example 1—Filler-1

Filler-1 was prepared from an aqueous dispersion, using a spray drying technique, as follows: Standex230, 49 g, was added to 1,100 g of deionized water and stirred continuously. After 10 minutes, 720 g of GF was added over a 1 minute time interval. Note that the GF was ground down to a particle size of about 4.2 micrometers, prior to use. MCD1, 880 g, was then added to the solution with continual stirring. The final dispersion step included homogenization at 10,000 RMP for 10 minutes. The solution was then atomized in a 1 mm co-current, nozzle atomizer, a MOBILE MINER 2000 from GEA Process Engineering A/S, Soborg, Denmark. The atomization pressure was set at 2 bar with air flow at 70-80% maximum. Air was supplied at 200° C. into the atomization chamber and was used to dry the droplets as they formed, producing spray dried, ceramic abrasive composites. The collected composites were then combined with AlOx, forming a 65/35 composite/AlOx (wt./wt.) powder blend. The powder blend was vitrified at 750° C. for 1 hour. After cooling, the vitrified, ceramic abrasive composites were passed through a conventional sieve having openings of about 38 micrometers. The collected vitrified, ceramic abrasive composites, having a particle size of about 38 micrometers and less were designated as Filler-1.

3D Printing of Comparative Abrasive Article (CE-1) Using Binder Jetting

A powder mixture was prepared by weight of:67% polyurethane powder PU-1 and 33% Filler-3. Powder mixture was prepared by dry mixing and placed into the feed piston of the ExOne M-Lab printers (ExOne Company, North Huntingdon, PA). A 3D model was prepared into a file to make an example piece, and the file was prepared into a print job using the ExOne software. The powder mixture was printed in the ExOne M-Lab Innovent where key parameters were as follows: layer height was 100 microns, roller speed was 5 mm/sec, printing saturation was set to the nominal 90% level, and drying time was set at 15 seconds. The binder choice was BS004. The printed part was dried overnight at room temperature. After the print had finished, the part and the powder bed were extracted from the printer. The printed 3D part (CE-1) was found to be quite stable. The depowdered part was heat-treated at 210° C. for 1 hour, during which time CE-1 decreased in size and became hard and durable.

3D Printing of Abrasive Sleeves (EX1-EX6) with Formulated Resins

Unless otherwise noted, all 3D-printed examples were prepared using an Asiga Pico 2, a vat polymerization 3D printer available from Asiga USA, Anaheim Hills, CA The Asiga Pico 2 printers are equipped with a LED light source of 385 nm and a custom vat that includes a PFA6515TZ window film (Dyneon GmbH (Burgkirchen, Germany)). A layer of 3M Micropore surgical tape (product number 1535-1, 3M Company (St. Paul, MN)) was applied to the build platform to improve the adhesion between the printed part and the build platform. The abrasive article design was provided as an .STL file.

The abrasive sleeves were printed with each of the formulations listed in Table 2. Specifically, for EX-1 to EX-6, all materials, except the fillers, were first charged to a speed mixer cup under ambient conditions. The formulations were then speed mixed using a DAC-150 FV Speed Mixer (Hauschild & Co. KG, Germany) set to 3000 rpm and 1 minute intervals until the resin is fully homogeneous. The fillers were subsequently added, and formulations were speed mixed again to obtain homogeneous printing paste. The resin bath of the printer was heated to 40° C. before photopolymerization to reduce the viscosity of the printing resin.

For EX-1 to EX-4, the following settings were used for the printing: slice thickness=50 μm; burn in layers=1; separation velocity=3 mm/s, separation distance=6 mm, approach velocity=2 mm/s, burn-in exposure=20 s, normal exposure=1.75 s (unless indicated otherwise), and a slide speed of 7 mm/min with 1 slide per layer. For EX-6, the same settings were used as EX-1 to EX-4 except that the burn-in exposure=25 s and the normal exposure=1.4 s. Each of EX-1 to EX-4 was printed to have a shape of the polymer bond abrasive article in FIG. 3. EX-6 was printed to have a shape of the polymer bond abrasive article in FIG. 5L.

Figure 5L:
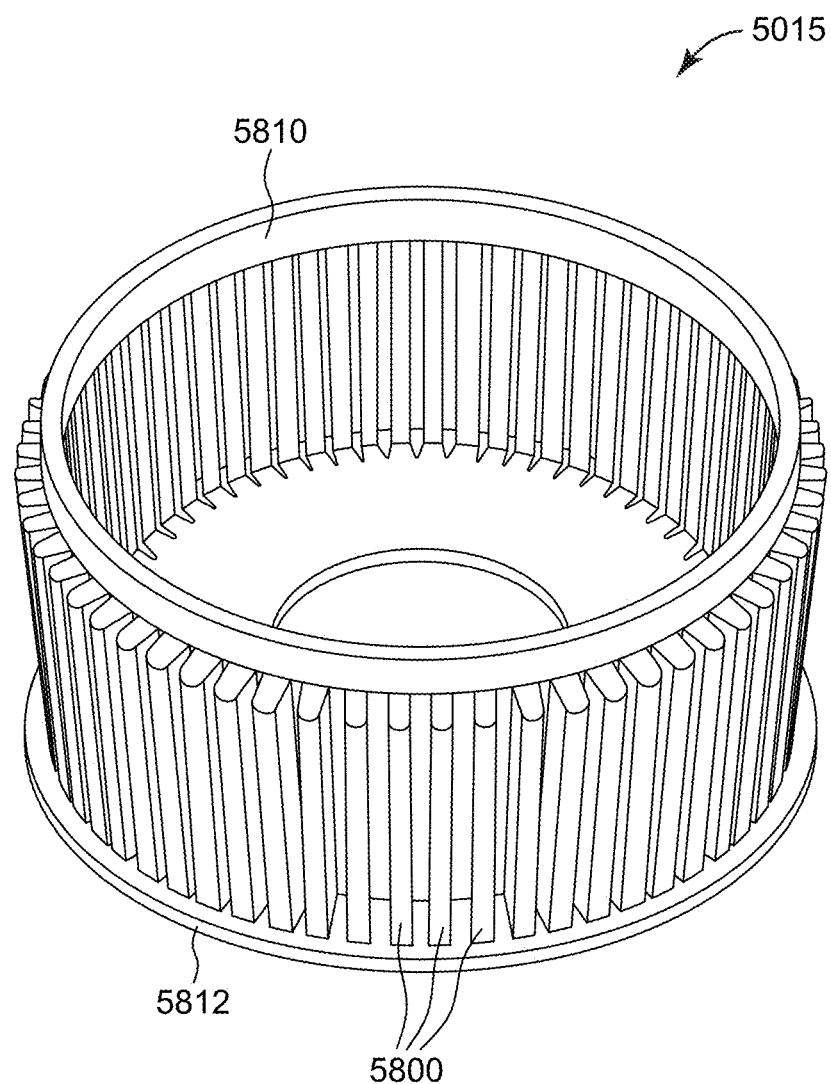
FIG. 5L is a photograph of an exemplary polymer bond abrasive article prepared in Example 6 (EX-6).

Excess resin on the surfaces of the printed articles (EX-1 to EX-3) was removed in isopropyl alcohol (IPA, obtained from VWR Chemicals) under manual agitation for 5 minutes, twice. The washed parts were dried under ambient conditions overnight. For EX-4 and EX-6, excess resin on the surfaces of the printed articles was removed using centrifugation at 1500 rpm for 1 minute, twice. The printed articles (EX-4 and EX-6) were then conditioned in an oven set at 120° C. for 2 hours. FIG. 5L is a photograph of the printed article of EX-6. The article is a polymer bond abrasive article 5015 having a cylindrical shape comprising a plurality of separated substructures 5800. The separated substructures are attached to the polymer bond abrasive article 5015 at one end 5810 of the polymer bond abrasive article 5015 and also an opposing end 5812 of the article 5015.

Example 5 (EX-5) was prepared using a modified Asiga Plus, also from Asiga USA, Anaheim Hills, CA This Asiga Plus printer was modified to have a LED light source of 460 nm. A custom vat with a PFA6515TZ window film and a build platform with 3M Micropore surgical tape (1535-1) were also used. The samples were printed, using the .STL file, at room temperature. A manual burn-in layer was made by lowering the build platform to z-height=0 and illuminating the LED manually for 15 s, after which the build platform was raised to standard starting position. The following settings were used for the printing: slice thickness=25 μm; burn in layers=4; separation velocity=1 mm/s, separation distance=5 mm, approach velocity=2 mm/s, burn-in exposure=8 s, normal exposure=2 s (unless indicated otherwise), and a slide speed of 10 mm/min with 1 slide per layer. Excess resin on the surfaces of the printed articles was removed in IPA under agitation, for 5 minutes. The washed parts were dried under ambient conditions overnight.

Fabrication of Glass Polishing Tools (EX-7) with 3D Printed Abrasive Sleeves (EX-4)

FIG. 3 illustrates the construction of the glass polishing tools (EX-7) with printed abrasive sleeve (EX-4). Specifically, circular foam rubber (3M Company, Bumpon SJ6008, ⅛" thick (0.32 cm)) was first laser cut to ⁷⁄₁₆" (0.44 cm) outer diameter and ⅜" (0.38) in inner diameter, so that it would fit into the abrasive sleeve (EX-4, ⁷⁄₁₆" (0.44 cm) inner diameter). The steel shank (Part No. 91595A476 from McMaster-Carr, 6 mm OD, 40 mm long) was inserted into the center cavity with 500 micrometer runout. The tool was dressed with diamond dresser to improve runout. Cyanoacrylate (Scotch-Weld CA4, 3M Company) glue was used to bond the rubber layer to both the abrasive sleeve and the steel shank.

Cross-Section Images of Printed Composite Articles from Vat Polymerization and Binder Jetting Scanning Electron Microscopy (SEM) Imaging:

The xy planes, which are perpendicular to the build direction, for printed EX-4 and CE-1 were analyzed using SEM. An arbitrary xy plane for the printed article was prepared by first cutting a notch using a razor blade. The xy plane was subsequently exposed by fracturing the article at the notch using plyers. The samples for surface images were mounted on conductive carbon tape tabs with exposed xy plane facing up. The tabs were mounted on an SEM stub and a thin coating of AuPd (20 mA/60 sec) was deposited to make them conductive. Imaging was conducted at 10 kv, and 11 mm wd, with an SE detector and in Low Mag Mode, with no tilt, at 30×, 200× or 1200× magnification. A general purpose analytical scanning electron microscope (obtained under the trade designation "JSM-6010LA" from JOEL Ltd., Tokyo, Japan) was used for imaging.

FIGS. 4A, 4C and 4E show the cross sections of EX-4, while FIGS. 4B, 4D and 4F show the cross section of CE-1. The cross-section SEM images indicated that polymer matrix for the composite article printed using vat polymerization is continuous, while that for the binder jet article is discontinuous.

Test Methods

Abrasive Effective Test

A partially-finished cover glass following a scribing and rough grinding operation was provided. The cover glass material was GORILLA glass 3 (GG3) from Corning (Corning, NY) and 1.1 millimeters thick. The partially finished cover glass was edge ground using a CNC machine to form the desired size and shape. The edge ground cover glass was then abraded using a modified mini mill from Little Machine Shop (Pasadena, CA) and a cylindrical abrasive tool (EX-6) to improve the surface finish of the ground edges. The cylindrical abrasive tool was about 14 mm in outer diameter. The abrasive test was conducted at 1 lb (0.45 kg) force, 10 minutes each, run at 3000 revolutions per minute (rpm). The mini mill's drive pulley was modified to allow the mini mill to operate at 3000 rpm and a linear sliding bearing Model # NBT-3105A from Del-Tron, (Bethal, CT) was mounted on the mini mill's bed and fit with a fixture to secure the glass. A nylon line, pulley and weight were used to control force of the glass edge into the rotating cylindrical abrasive tool. The glass (GG3) weight was measured before and after each 10 minute test. The amount of glass cut after each run was recorded in Table 3. The results show that the vat polymerized polishing sleeve enabled material removal. The surface finish was measured using a Bruker Contour GT (Bruker Corporation, Eden Prairie, MN), using vertical scanning interferometry (VSI) with white light at a magnification of 5×. Two relevant surface finish parameters were measured: Sa is defined as the absolute difference in height of each point compared to the arithmetical mean of the surface, while Sz is defined as sum of the absolute values of the largest peak height and the largest pit depth within the defined area. The finished glass edges exhibited consistent roughness.

Wear of the abrasive tool was measured using a VHX 5000, digital microscope from Keyence, (Osaka, Japan). The worn cylindrical abrasive tool was horizontally positioned on the microscope stage, and focus was adjusted to view the edge of the abrasive allowing a comparison of unused to used area of the tool profile. The VHX 5000 measurement software with two parallel lines was used to determine the amount of abrasive wear. The wear was measured after three 10 minute tests to get an average wear rate for the abrasive. EX-6 exhibited less than 20 micrometers of wear under 1 lb (0.45 kg) force after 30 minutes.

TABLE 3

Quantification on Cut Rate and Surface Finish

| EX-7 | Cut (mg) | $S_a$ (nm) | $S_z$ (nm) |
|---|---|---|---|
| 1$^{st}$ 10 min | 6.2 | 121 | 3050 |
| 2$^{nd}$ 10 min | 5.9 | 98 | 2845 |
| 3$^{rd}$ 10 min | 5.0 | 106 | 3035 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making a polymer bond abrasive article, the method comprising:
    a) obtaining a photocurable composition liquid dispersion comprising:
        i) at least one photocurable monomer;
        ii) abrasive particles;
        iii) a photoinitiator; and
        iv) an optical brightener;
    b) selectively curing a portion of the photocurable composition; and
    c) repeating steps a) and b) to form the polymer bond abrasive article comprising a continuous photocured polymer matrix comprising abrasive particles retained therein and the optical brightener, and wherein the polymer bond abrasive article has a three-dimensional shape.

2. The method of claim 1, wherein the optical brightener is present in an amount of greater than 0.01 weight percent (wt. %), based on the total weight of the continuous photocured polymer matrix.

3. The method of claim 1, wherein the continuous photocured polymer matrix is formed of a plurality of layers having an average thickness of 10 micrometers or greater; and an average thickness of 150 micrometers or less.

4. The method of claim 1, wherein the abrasive particles comprise ceramic abrasive agglomerates, wherein the ceramic abrasive agglomerates comprise individual abrasive particles dispersed in a porous ceramic matrix, and wherein at least a portion of the porous ceramic matrix comprises glassy ceramic material.

5. The method of claim 1, wherein the abrasive particles comprise at least one of diamond particles, metal oxide ceramic particles, or non-oxide ceramic particles.

6. The method of claim 1, wherein the abrasive particles comprise at least one of cubic boron nitride, silicon carbide, titanium diboride, titanium nitride, boron carbide, tungsten carbide, titanium carbide, aluminum nitride, aluminum oxide, diamond, fused alumina-zirconia, sol-gel derived abrasive particles, or silicon nitride particles.

7. The method of claim 1, wherein the abrasive particles exhibit a Mohs hardness of 9-10.

8. The method of claim 1, wherein the continuous photocured polymer matrix comprises a reaction product of at least one monomer selected from vinyl monomers, oxirane monomers, oxetane monomers, cyclic olefin monomers, or thiol-ene monomers.

9. The method of claim 8, wherein the continuous photocured polymer matrix comprises a reaction product of the at least one monomer and at least one oligomer exhibiting a viscosity of 40 Pascal seconds (Pa·s) or greater.

10. The method of claim 1, wherein the polymer bond abrasive article comprises 0.1 volume percent (vol. %) to 70 vol. % of the abrasive particles.

11. The method of claim 1, wherein the polymer bond abrasive article comprises 0.5 weight percent (wt. %) to 80 wt. % of the abrasive particles.

12. The method of claim 1, wherein the polymer bond abrasive article comprises a cylindrical shape, a conical shape, a spherical shape, a disc shape, or a hemispherical shape.

13. The method of claim 1, wherein the polymer bond abrasive article comprises a plurality of separated substructures each having a three-dimensional pattern disposed on an exterior surface thereof.

14. The method of claim 1, wherein the continuous photocured polymer matrix defines one or more tortuous or arcuate channels, one or more architectural voids, one or more undercuts, one or more perforations, or combinations thereof.

15. An abrasive tool comprising the polymer bond abrasive article made by the method of claim 1, wherein the polymer bond abrasive article is affixed to a shaft or a pad.

16. The method of claim 1, wherein the photocurable composition is cured using actinic radiation comprising UV radiation, e-beam radiation, visible radiation, or a combination thereof.

* * * * *